United States Patent [19]
Kurita et al.

[11] Patent Number: 5,165,072
[45] Date of Patent: Nov. 17, 1992

[54] IMAGE PROCESSING APPARATUS WHICH DETECTS A LINE IMAGE

[75] Inventors: Mitsuru Kurita, Tokyo; Masahiro Funada; Hiroyuki Takahashi, both of Yokohama; Tatsuhito Kataoka, Tokyo; Koji Kajita, Yokohama, all of Japan

[73] Assignee: Canon Kabushiki Kaisha, Tokyo, Japan

[21] Appl. No.: 691,967

[22] Filed: Apr. 26, 1991

[30] Foreign Application Priority Data
Apr. 27, 1990 [JP] Japan .................... 2-111973

[51] Int. Cl.$^5$ .................................. G06K 9/36
[52] U.S. Cl. ............................ 358/448; 382/24
[58] Field of Search ............... 358/448, 75–80; 382/16, 19, 24

[56] References Cited
U.S. PATENT DOCUMENTS

| | | | |
|---|---|---|---|
| 4,771,474 | 9/1988 | Takashima et al. | 382/24 |
| 4,797,945 | 1/1989 | Suzuki et al. | 382/56 |
| 4,901,365 | 2/1990 | Kelland | 382/24 |
| 4,958,219 | 9/1990 | Kadowaki | 358/75 |
| 5,031,034 | 7/1991 | Shimizu et al. | 358/79 |

Primary Examiner—Stephen Brinich
Attorney, Agent, or Firm—Fitzpatrick, Cella, Harper & Scinto

[57] ABSTRACT

An image processing apparatus includes a) a memory unit for storing input image data, b) a detecting unit for detecting a black line image using at least one of the input image data and image data read out from the memory unit, and c) a processing unit for performing image processing on the basis of the data read out from the memory unit and the detection result.

26 Claims, 22 Drawing Sheets

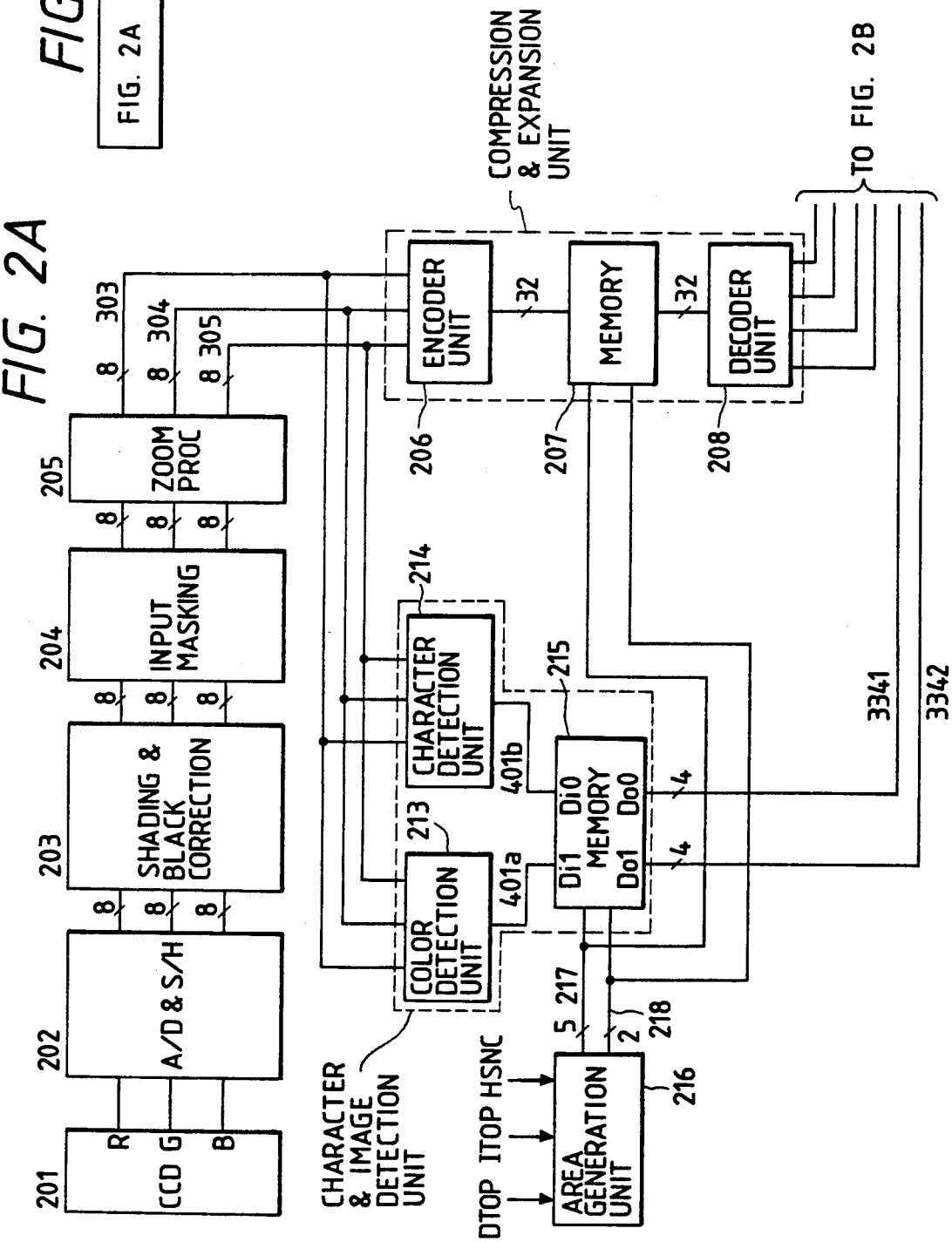

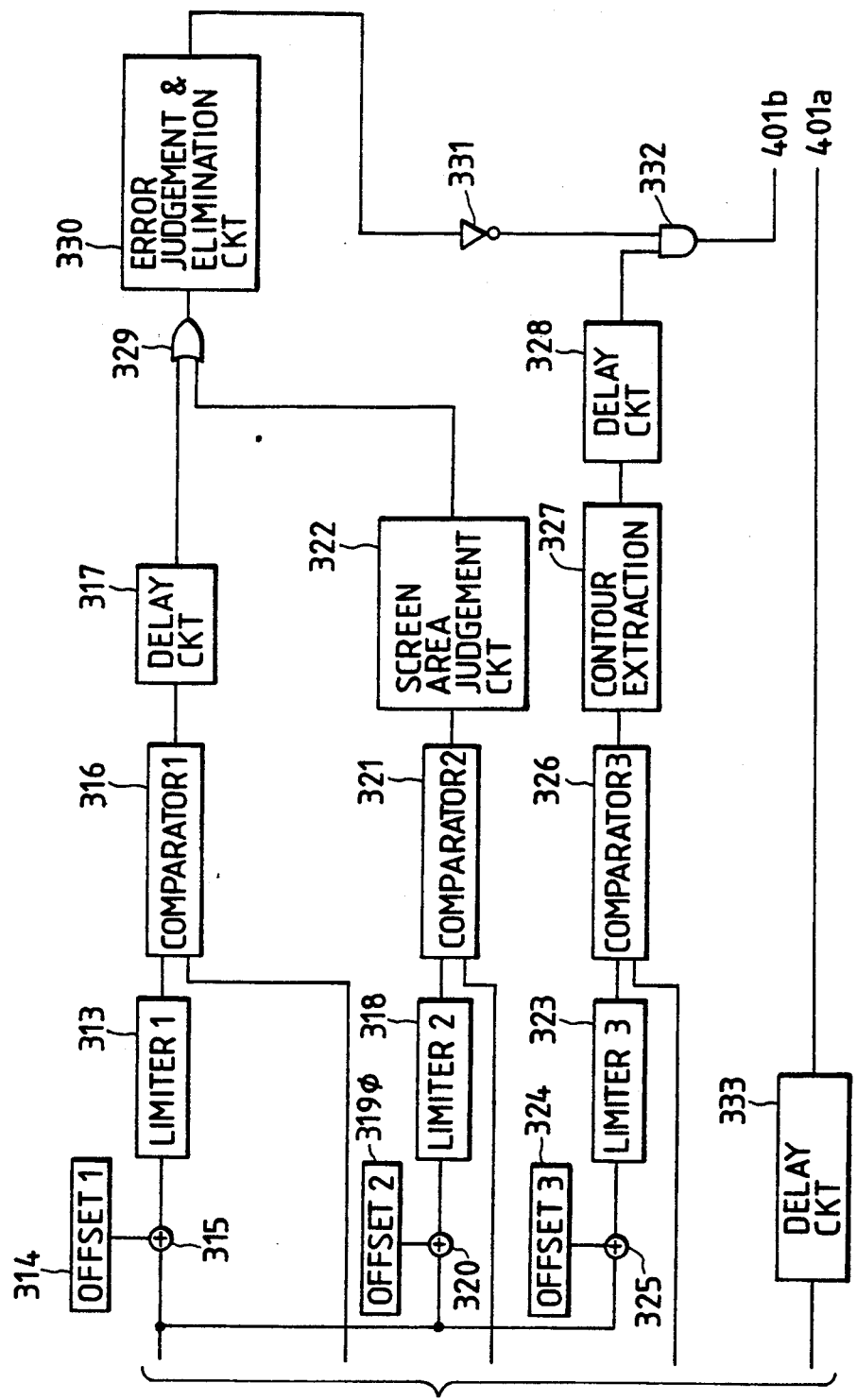

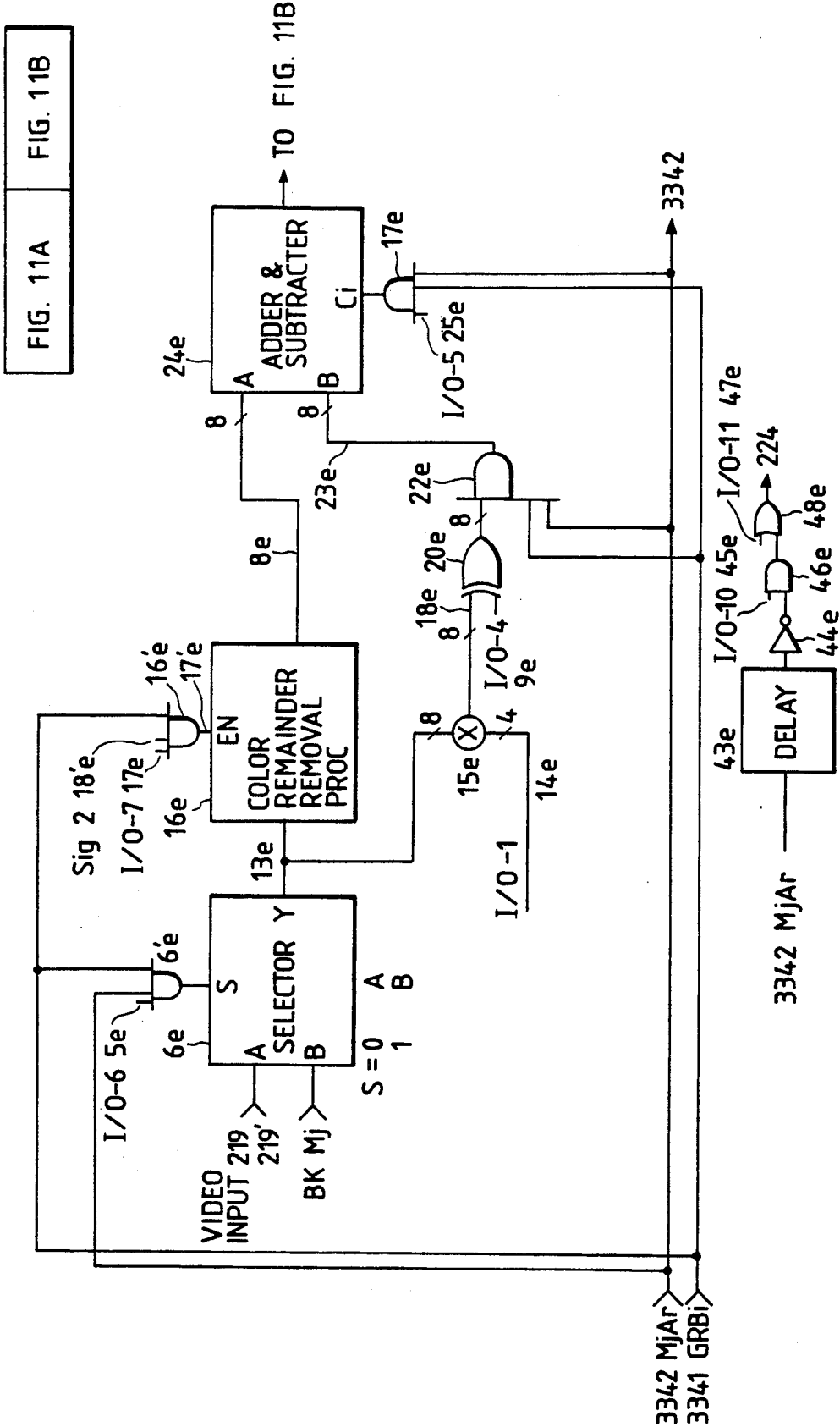

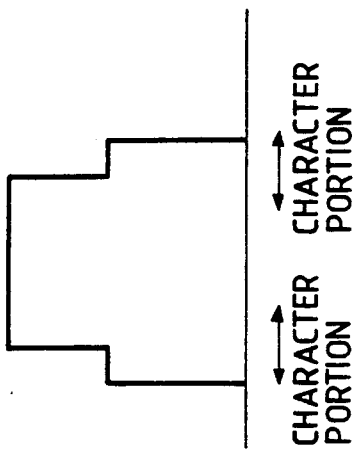
FIG. 12C
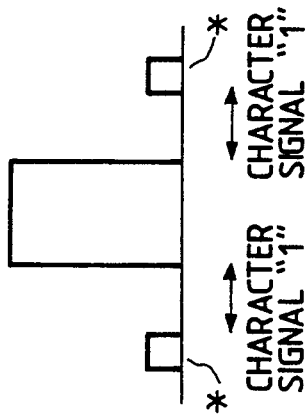
FIG. 12D
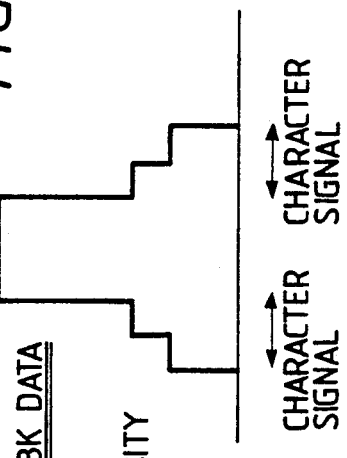
FIG. 12E
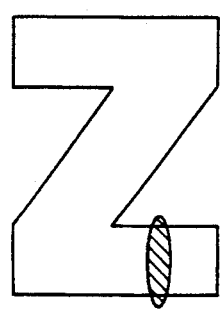
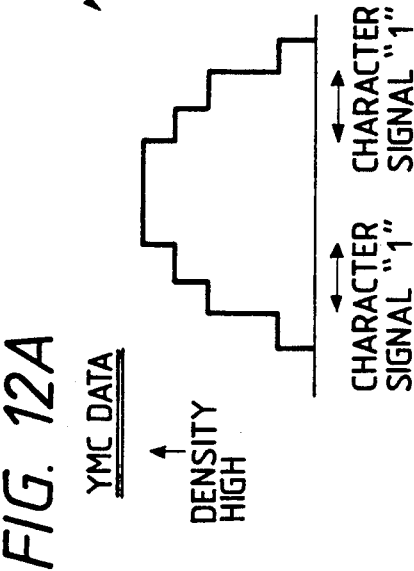
FIG. 12A
FIG. 12B $a \rightarrow \frac{1}{8}$ STEP 0~1

$A + a\{4A - (B+C+D+E)\}$ $V_N = \dfrac{V_N + V_{N-1}}{2}$

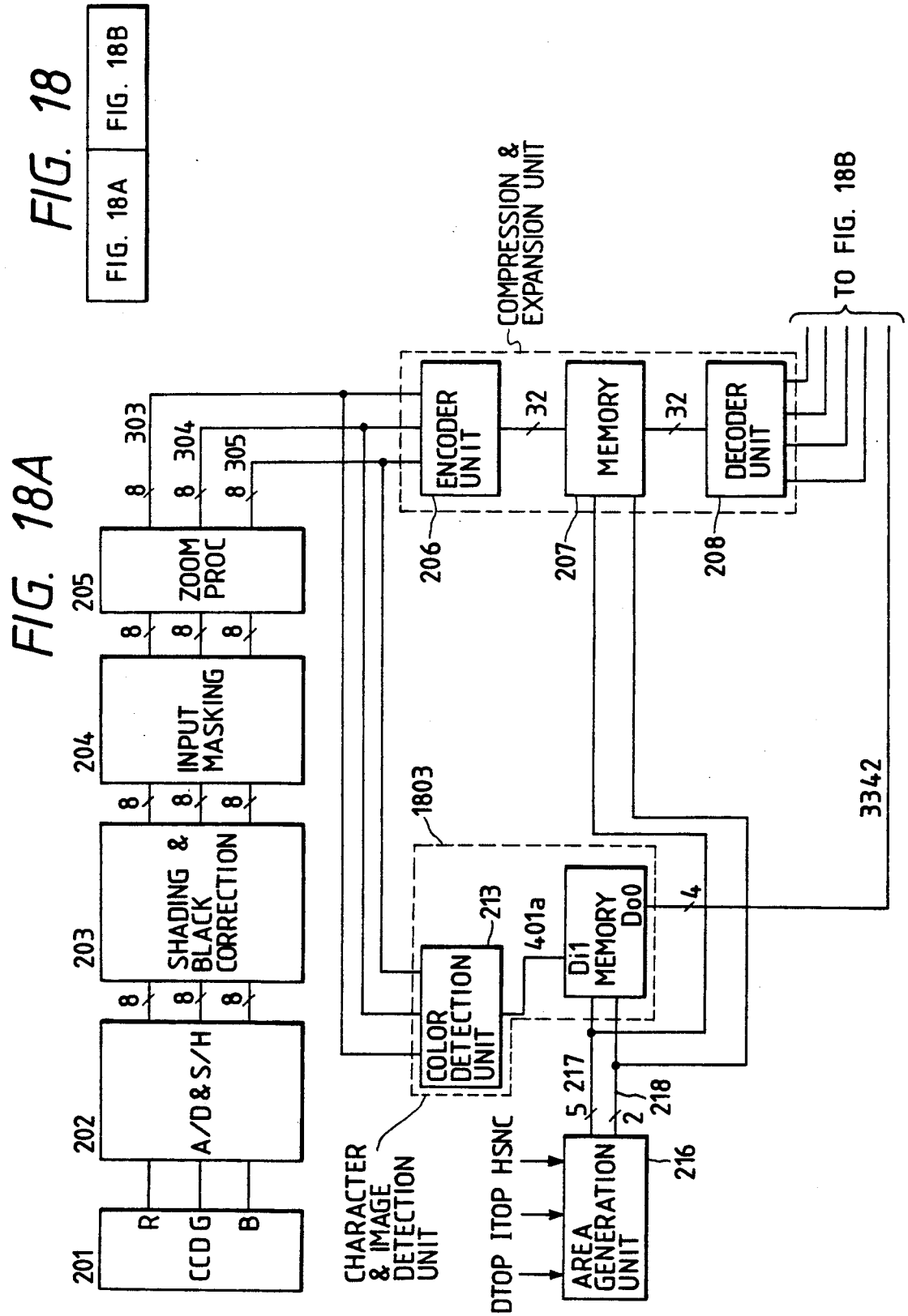

IMAGE PROCESSING APPARATUS WHICH DETECTS A LINE IMAGE

BACKGROUND OF THE INVENTION

1. Field of the Invention

The present invention relates to an image processing apparatus for digitally processing an input image.

2. Related Background Art

Recently, a digital color copying machine which color-separates a color original, reads it in units of pixels, digitally processes the read image data, and outputs the processed data to a color printer to obtain a digital color hard copy has become widespread (FIG. 1A). In addition, in order to satisfy a requirement for higher speeds there is proposed a system which comprises four drums and in which images of respective colors are printed in units of drums and output from an LBP (Laser Beam Printer), as shown in FIG. 1B.

On the other hand, a demand has increasingly arisen for a system capable of printing a color reflecting original such that characters look more like characters and natural (e.g., photographic) images look more like natural images. To satisfy this demand, there is proposed a technique of separating a character portion from an image portion by image area separation. In this method, high-resolution processing is performed for the character portion such that especially black characters are printed out in black monochrome, whereas high-gradation processing is performed for the image portion. (U.S. patent application Ser. No. 173,654, U.S. Pat. No. 4,958,219, and U.S. patent application Ser. Nos. 327,098, 367,673, 519,500, 519,448, and 519,447.)

In the above color copying machine comprising four drums, a memory for storing image data is an essential part, and the image data must be compressed before it is stored if cost and transmission rate are taken into consideration.

However, there exists no conventional system in which image area judgment is performed in a system for compressing and storing image data in a memory and image processing is performed on the basis of the judgment result.

In addition, in order to realize the above operation by using a system of the conventional techniques, an operator must perform area designation for a character portion, especially a black character portion by using a digitizer or the like so that only the designated portion is subjected to high-resolution processing in black monochrome and output.

SUMMARY OF THE INVENTION

It is an object of the present invention to eliminate the drawbacks of the above conventional techniques, i.e., to provide an image processing apparatus capable of obtaining a high-quality image.

In order to achieve the above object, according to the present invention, there is provided an image processing apparatus comprising memory means for storing input image data, detecting means for detecting the feature of an image using at least one of the input image data and image data read out from the memory means, and image processing means for performing image processing on the basis of the data read out from the memory means and the detection result.

It is another object of the present invention to provide an image processing apparatus suitable for high-speed image processing.

In order to achieve the above object, according to the present invention, there is provided an image processing apparatus comprising compressing means for compressing input image data, first memory means for storing the compressed image data, second memory means for storing a predetermined color leg, black-line image portion of the input image data, and control means for synchronously reading out the contents stored in the first and second memory means.

It is still another object of the present invention to provide an image processing apparatus capable of precisely detecting the feature of an image.

In order to achieve the above object, according to the present invention, there is provided an image processing apparatus comprising compressing means for compressing input image data, and detecting means for detecting the feature of the input image, wherein the detecting means detects at least the feature related to colors of the input image before the input image is compressed by the compressing means.

The other objects and aspects of the present invention will become apparent from the following description taken in conjunction with the accompanied drawings and the appended claims.

BRIEF DESCRIPTION OF THE DRAWINGS

FIGS. 12A to 12E are views showing addition & subtraction processing;

DETAILED DESCRIPTION OF THE PREFERRED EMBODIMENTS

According to an embodiment of the present invention to be described below, there are provided input image data reading means, image data compressing means, memory means for storing compressed data, memory output expanding or decompressing means, detecting means for detecting the feature of an image using the input image data or the expanded data, and image processing means for performing image processing on the basis of an output from the memory and the detection result, and image area separation processing is performed in a system of compressing and storing an input image in a memory.

First Embodiment

Figure 1A:
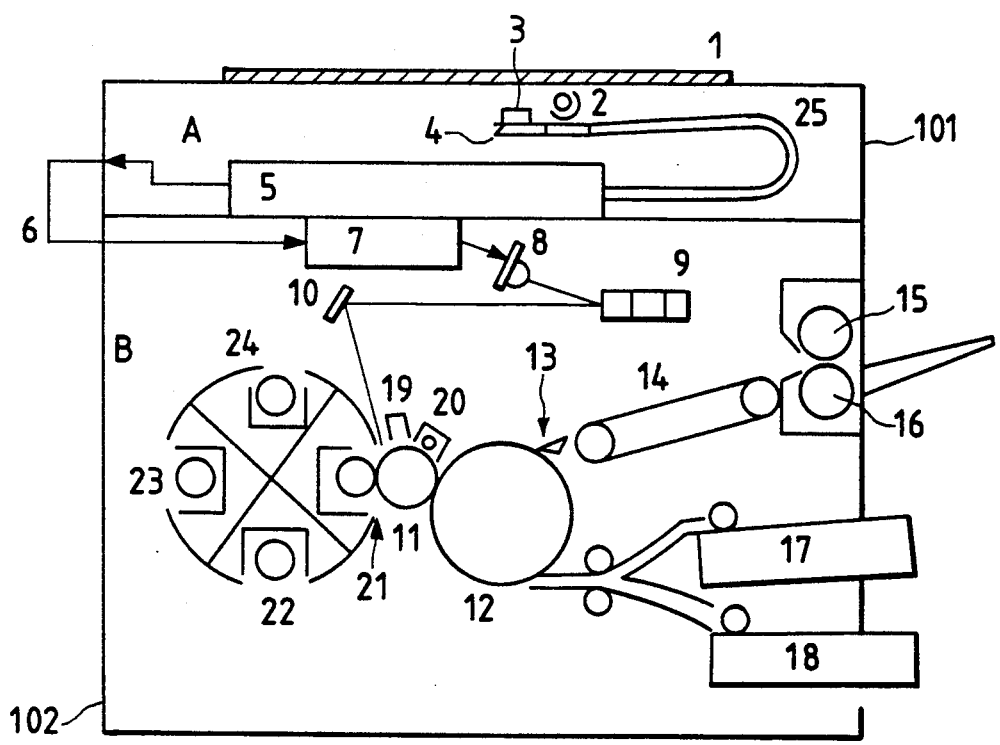
FIGS. 1A and 1B are sectional views showing image processing apparatuses according to the present invention.

FIG. 1A shows a color copying machine as one embodiment of the present invention. This color copying machine color-separates a color original in units of pixels to digitally read the original as electrical signals and forms a full-color print image by a laser beam printer unit of an electrophotographic type. Referring to FIG. 1A, a section A corresponds to an image reading unit, and a section B corresponds to an image printing unit. In the image reading unit A, a color original 1 is illuminated with an original exposure D lamp 2, and a color reflected-light image reflected by the color original is focused on a color image sensor 3. A color image signal color-separated in units of pixels by the color image sensor is signal-processed by a color signal processor 4 and input to an image processor 5 through a cable 25. The image processor 5 converts the input signal into a digital signal, performs digital image processing on the color signal to execute color correction, and supplies the digital image signal to the image printing unit. In accordance with the image data supplied to the printing unit through a cable 6, a semiconductor laser driver 7 modulates a semiconductor laser 8 to form a raster-like color-separated monochromatic latent image on a photosensitive drum. The formed latent image is visualized (developed) by a developing unit 21, and a color-separated toner image is formed on the photosensitive drum. A sheet of copying paper is supplied from a cassette 17 (or 18) and wound around a transfer drum 12, and toner is transferred onto the copying sheet in synchronism with the above color-separated toner image.

As is apparent from FIG. 1A, since only an image of one color can be formed in one image formation step, the original color separation step is repeated a number of times corresponding to the number of toner colors, i.e., four times for Y (yellow), M (magenta), C (cyan), and K (black). Similarly, in synchronism with the respective color separation steps, the steps of latent image formation→development→transfer are repeatedly performed in accordance with the number of color components. The copying paper wound around the transfer drum 12 is rotated four times to finish transfer of the four colors and peeled by a peeling pawl 13. The peeled paper is guided to heat-pressure fixing rollers 15 and 16 to fix the toner image on the copying paper and is discharged outside the machine, thereby finishing one full-color copying operation. That is, in the color copying machine of this type, some of a series of copying steps must be performed separately for each of the color-separated images Y, M, C, and K. Therefore, this color copying machine is unsuitable to further increase the operation speed.

Figure 1B:
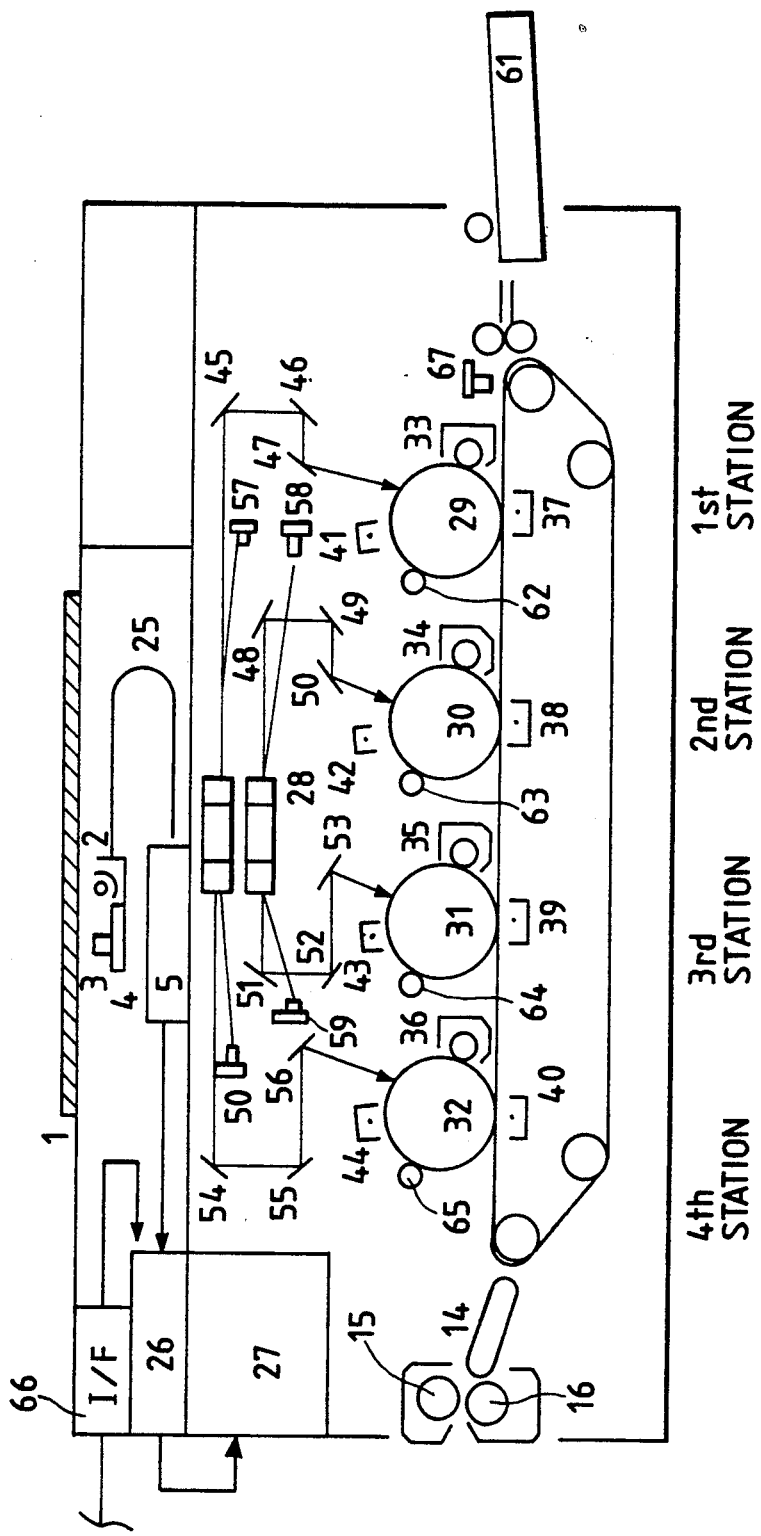

As another embodiment of the present invention for realizing a higher operation speed in consideration of the above situation, a color copying machine having an arrangement as shown in FIG. 1B will be described below (in which the same reference numerals as in FIG. 1A denote parts having the same functions).

An original placed on an original table 1 is illuminated by an illumination lamp 2, and a color-separated image is read by a CCD color sensor 3 and subjected to digital image processing by an image processor 5 via a color signal processor 4 and a cable 25, as in the apparatus shown in FIG. 1. In the apparatus having this arrangement, however, full-color image signals of one page are temporarily stored in a memory 26. That is, as will be described later, in the apparatus of this type, since a plurality of parallel photosensitive drums (image formation units) are arranged to simultaneously form images of a plurality of colors, an image corresponding to at least a distance between adjacent image formation units must be stored. The image formation units of the respective colors M (magenta), C (cyan), Y (yellow), and K (black) independently have photosensitive drums (29 to 32), primary chargers (41 to 44), developers (33 to 36), transfer chargers (37 to 40), and cleaner devices (62 to 65). When paper supplied from a cassette advances, the leading edge of the paper is detected by a detector 67. In synchronism with a paper leading edge signal, an image signal of each color component stored in the memory 26 is read out at a proper timing by a timing controller (not shown) and subjected to signal processing by a second digital image processing unit 27. Thereafter, a light beam emitted from a semiconductor laser 57 and modulated in accordance with an M (magenta) image is reflected by a polygonal mirror 28 and reflecting mirrors 45, 46, and 47 and radiated on the photosensitive drum 29 to form a latent image. Magenta toner is developed by the developer 33, and a magenta image of the first color is formed on copying paper by the transfer charger 37. Subsequently, in the second, third, and fourth stations, C (cyan), Y (yellow), and K (black) images are similarly, precisely developed and transferred, respectively. Thereafter, these images are fixed by fixing rollers 15 and 16 to complete a copying operation of one sheet.

Since a plurality of parallel image formation units are arranged as described above, a large-capacity memory for storing image data of one frame is required to complete one full-color copy. The present invention to be described below is particularly effective in an apparatus of this type.

Figure 2B:
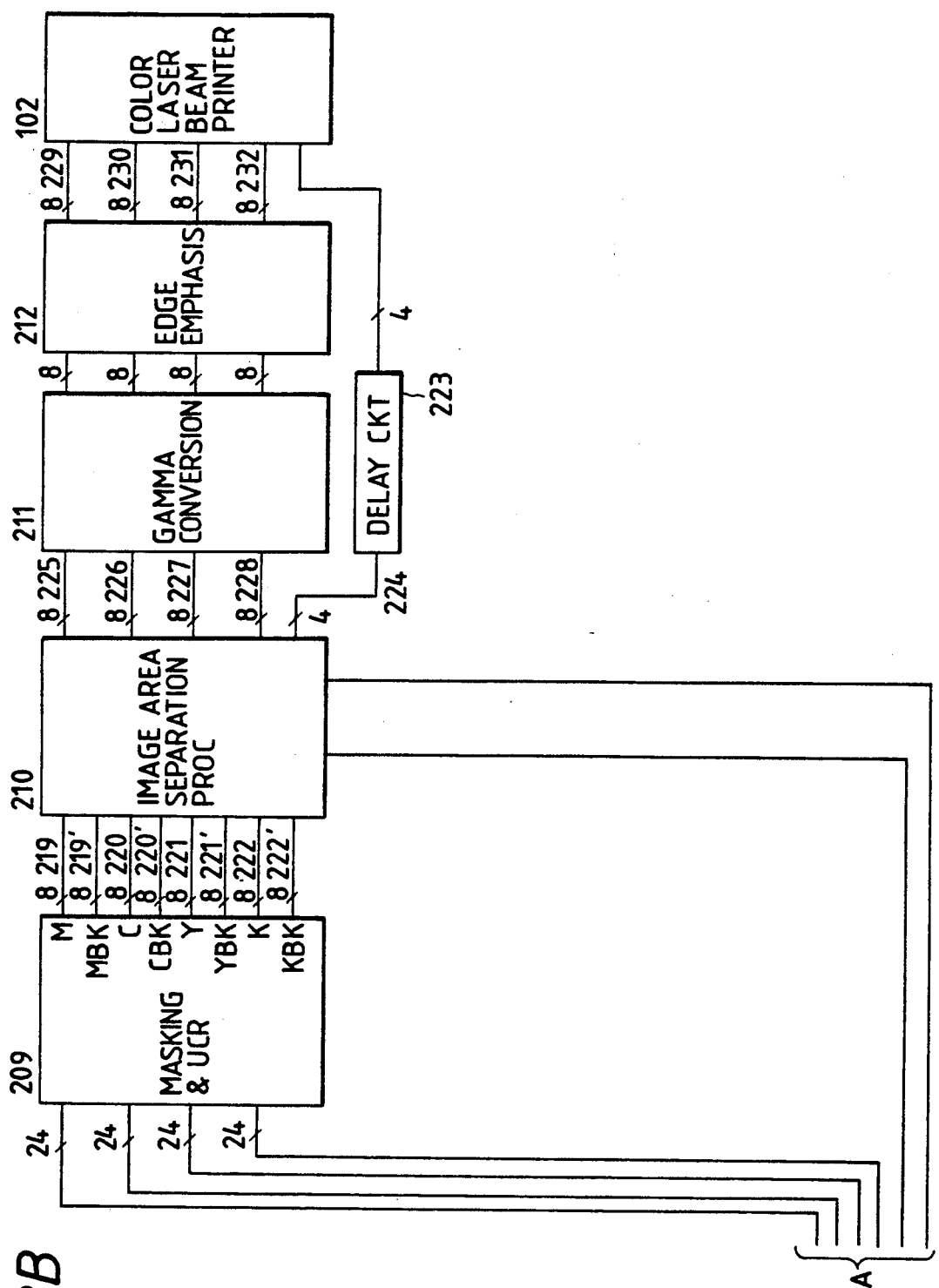
FIG. 2, consisting of FIGS. 2A and 2B, is a block diagram showing the entire arrangement of an apparatus of the present invention.

FIG. 2 is a block diagram showing the entire arrangement of an image processing apparatus of the present invention. This image processing apparatus comprises a color reader unit 101 for reading a color original and performing, e.g., digital editing and other signal processing, and a laser color printer 102, having image carriers for respective different colors, for reproducing and outputting a color image in accordance with digital image signals of the respective colors supplied from the reader.

A digital image processing unit in the color reader unit 101 will be described below. A color original placed on an original table (not shown) is exposed by a halogen lamp (not shown). As a result, a reflected image is picked up by a CCD 201 and sample-held and A/D-converted by an A/D & S/H circuit 202 to generate digital signals of three colors R, G, and B. Each color-separated signal is subjected to shading correction and black correction by a shading & black correction circuit 203 and corrected into an NTSC signal by an input masking circuit 204. The corrected NTSC signal is subjected to zoom processing such as expansion or compression by a zoom processor 205 and input to an encoder unit 206 of a compression & expansion unit, and a color detection unit 213 and a character detection unit 214 of a character & image detection unit.

The compression & expansion unit (C & E unit) includes the encoder unit 206, a memory 207, and a decoder unit 208. The R, G, and B data compressed by the encoder unit 206 are written in the memory 207, and compressed codes read out from the memory 207 are expanded by the decoder unit 208. The decoder unit 208 outputs Y, M, and C signals to the respective drums.

A masking & UCR circuit 209 performs masking & UCR processing of the four colors, and an image area separation processor 210 performs image area separation processing on the basis of the results obtained by the character detection unit 214 and the color detection unit 213. A portion of a black character (line image) is recorded in black monochrome assuming that the values of Y, M, and C are 0's. A γ (gamma) converter 211 and an edge emphasis circuit 212 perform γ conversion and edge emphasis, respectively, and data of the four colors is output to the color laser beam printer 102.

An area generation unit 216 generates write and read main- and sub-scan enables of the memories 207 and 215 on the basis of an output DTOP from a drawing edge sensor, an output ITOP from a paper edge sensor, and a horizontal sync signal HSYNC.

Figure 3:
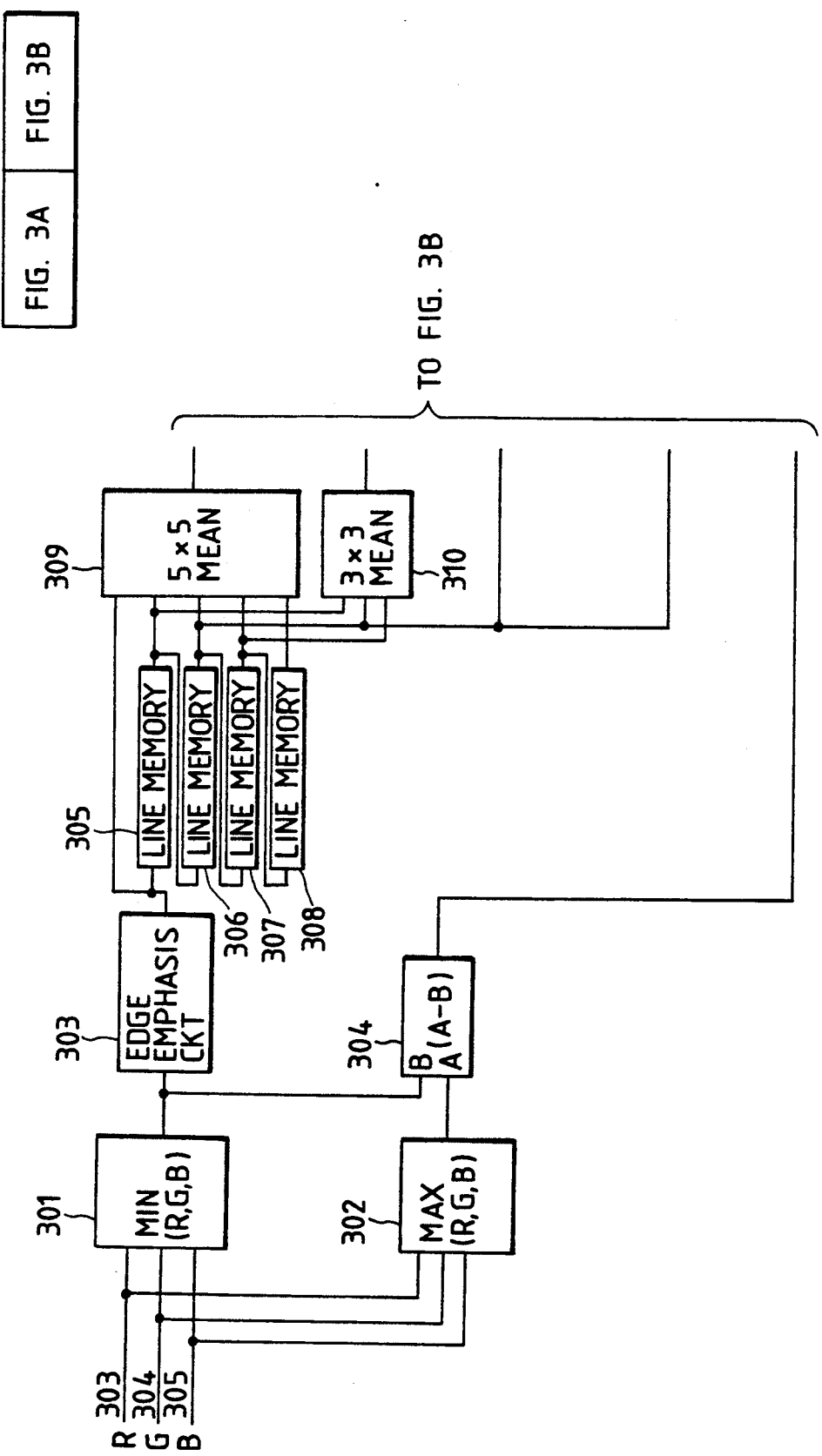
FIG. 3, consisting of FIGS. 3A and 3B, is a block diagram showing a character & image area separation circuit.

FIG. 3 is a view showing the character & image detection unit (213 to 215) in detail. Color-separated data 303, 304, and 305 are output from the zoom processor 205 to a minimum value detector Min (RGB) 301 and a maximum value detector Max (RGB) 302. In the respective blocks, the maximum and minimum values are selected from the three types of input R, G, and B luminance signals. A subtracter 304 calculates a difference between the selected two signals. If the difference is large, i.e., if the input R, G, and B signals are nonuniform, it is judged that these signals are not achromatic color signals indicating black and white but chromatic color signals shifted to some kind of colors. If the difference is small, it is judged that the R, G, and B signals are at substantially the same level and therefore are achromatic color signals not shifted to any kind of colors. This difference signal is output as a gray signal to a delay circuit 333 and the memory 215.

The minimum value signal obtained by the Min (RGB) 301 is also input to an edge emphasis circuit 303. The edge emphasis circuit 303 performs edge emphasis by executing the following arithmetic operation using adjacent pixel data in the main-scan direction:

$$D_{out} = 9/8 D_i - 1/16(D_{i-1} + D_{i+1})$$

$D_{out}$: image data obtained after the edge emphasis
$D_i$: i-th pixel data

Note that the method of the edge emphasis is not particularly limited to the above method but may be another conventional method such as a method of performing matrix processing using image data on a plurality of lines. The image signal edge-emphasized in the main-scan direction is subjected to mean value calculations in 5×5 and 3×3 windows performed by 5×5 and 3×3 mean circuits 309 and 310, respectively. Line memories 305 to 308 are delay memories in the sub-scan direction for performing mean processing. The 5×5 mean value calculated by the 5×5 mean circuit 309 is added to offset values independently offset by offset circuits 1 (314), 2 (319), and 3 (324) connected to a CPUBUS (not shown) by adders 315, 319, and 325, respectively. The 5×5 mean values obtained upon addition are input to limiters 1 (313), 2 (318), and 3 (323). The limiters are connected to the CPUBUS (not shown), and limiter values can be independently set in the respective limiters. If the 5×5 mean value is larger than the set limiter value, the output is clipped by the limiter value. The output signals from the respective limiters are input to comparators 1 (316), 2 (321), and 3 (326). First, the comparator 1 (316) compares the output signal from the limiter 1 (313) with the output from the 3×3 mean circuit 310. The comparison output from the comparator 1 (316) is input to a delay circuit 317 so as to be matched in phase with an output signal from a screen area judgment circuit 322 (to be described later). This binary signal is binary-converted by a mean value in order to prevent undesirable battering or splashing caused by MTF at a predetermined density or more and is passed through a 3×3 low-pass filter to cut high-frequency components of a screen image so as not to detect dots of the screen image upon binary conversion. An output signal from the comparator 2 (321) is subjected to binary conversion with through image data to detect the high-frequency components of the image so as to be judged by a screen image judgment circuit 322 in the subsequent stage. Since the screen image consists of dots, the screen area judgment circuit 322 confirms the dots in the direction of an edge and counts the number of dots in the peripheral portion, thereby detecting the screen area.

After an OR gate 329 ORs the judgment result of the screen area judgment circuit 322 obtained as described above and the signal from the delay circuit 317 an error judgment & elimination circuit 330 eliminates error judgment and outputs the result to an inverter gate 331. On the basis of the characteristics that a line image such as a character is thin and an image (halftone image or a screen image) has a wide area, the error judgment & elimination circuit 330 thins (performs thinning processing for) an image area of the binary signal to eliminate an isolated image area (isolated point elimination). More specifically, even if one pixel in a 1-mm side square area having a central pixel xij is judged to be a pixel other than an image, the central pixel is judged to fall outside the image area. In this case, a circuit for obtaining an AND of pixels of an N×N pixel block is used. After the image area of an isolated point is eliminated in this manner, thickening processing is performed to recover the thinned image area. More specifically, even if one pixel in a 2-mm side square area having a central pixel xij is judged to be a pixel falling within an image, the central pixel is judged to fall within the image area. In this case, a circuit for obtaining an OR of pixels of an N×N pixel block is used. The mask size used in the thinning processing is set to be equal to or smaller than that used in the thickening processing so as to cause the judgment result obtained by the thickening processing to cross. More specifically, the thinning processing is performed using a mask of 17×17 pixels and then a mask of 5×5, and the thickening processing is performed using a mask of 34×34 pixels.

Subsequently, in order to sharply process characters in the following stage, the contour of the input image signal is extracted from the output signal from the comparator 3 (326). In this extraction, the thinning processing and the thickening processing of the 5×5 block are performed for the binary output from the comparator 3 (326) to obtain a difference area between thickened and thinned signals as a contour. The contour signal extracted in this manner is supplied to a delay circuit 328 so as to be matched in phase with the mask signal output from the inverter 331, supplied to an AND gate 332, and then input as a character signal to the memory 215.

Figure 4:
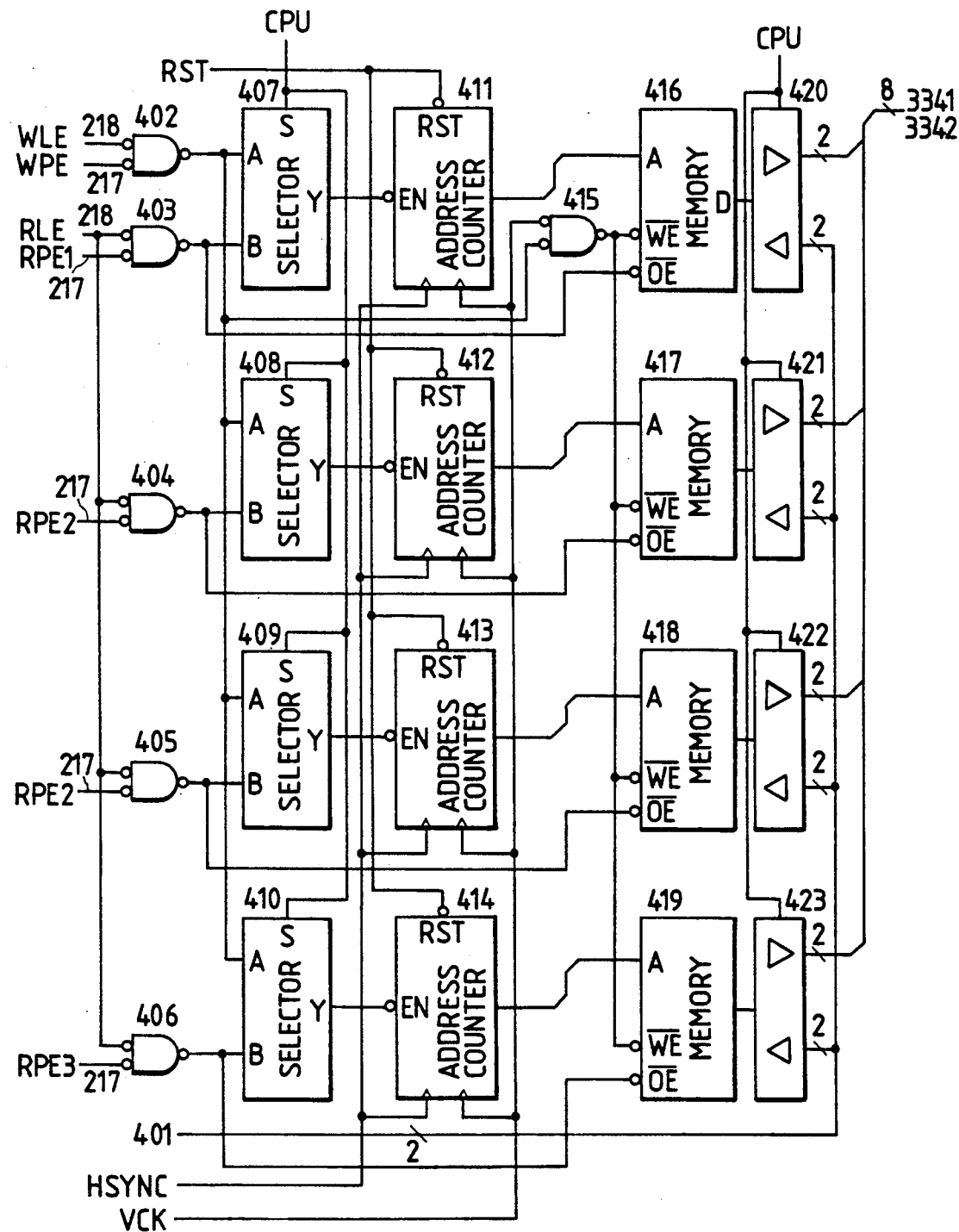
FIG. 4 is a block diagram showing a memory.

FIG. 4 is a view for explaining the memory 215 in detail. In this memory, the 2-bit result from the character image detection unit is written in four bit-map memories 416 to 419, and the data in the four memories are read out in synchronism with enable signals (RLE, RPE1 to RPE4) for the four drums (Y, M, C, and K).

An M drum memory unit comprises OR gates 402, 403, and 415, a selector 407, an address counter 411, the bit-map memory 416, and a bus selector 420. A C drum memory unit comprises an OR gate 404, a selector 408, an address counter 412, the bit-map memory 417, and a bus selector 421. A Y drum memory unit comprises an OR gate 405, a selector 409, an address counter 413, the bit-map memory 418, and a bus selector 422. A K drum memory unit comprises an OR gate 406, a selector 410, an address counter 412, the bit-map memory 419, and a bus selector 423. Since these four memory units have exactly the same arrangement, the M drum memory unit will be taken as an example in the following description.

The OR gates 402 and 403 generate enable signals of the address counter 411. In a write mode in which the OR gate 415 generates a WE signal of the memory 416, the A select and the write mode are selected in the selector 407 and the bus selector 420, respectively, by a CPU bus (not shown), and a signal 401 is written in the memory 416 on the basis of the WE signal and the output from the address counter 411. In a read mode, on the other hand, the B select and the read mode are set in the selector 407 and the bus selector 420, respectively, by the CPU bus (not shown), and the data is read out from the memory 416 on the basis of the OE signal and the output from the address counter 411 (3341 and 3342). The control operations of the other three drum memories are exactly the same as described above and therefore detailed descriptions thereof will be omitted.

The compression & expansion unit will be described below.

Figure 5:
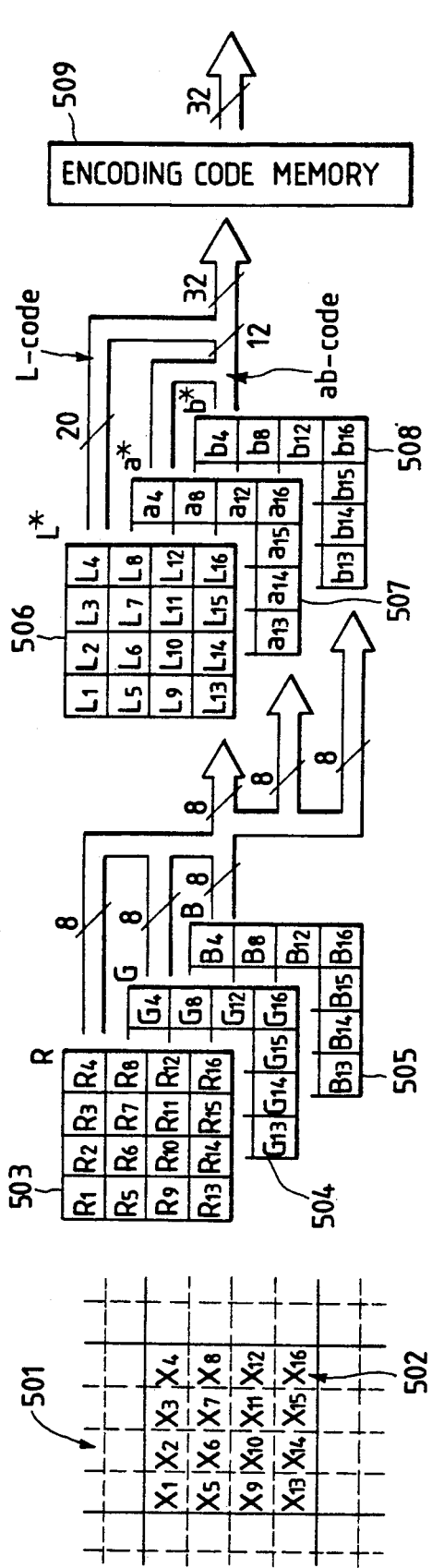
FIG. 5 is a view for explaining encoding of an image.
Figure 5:
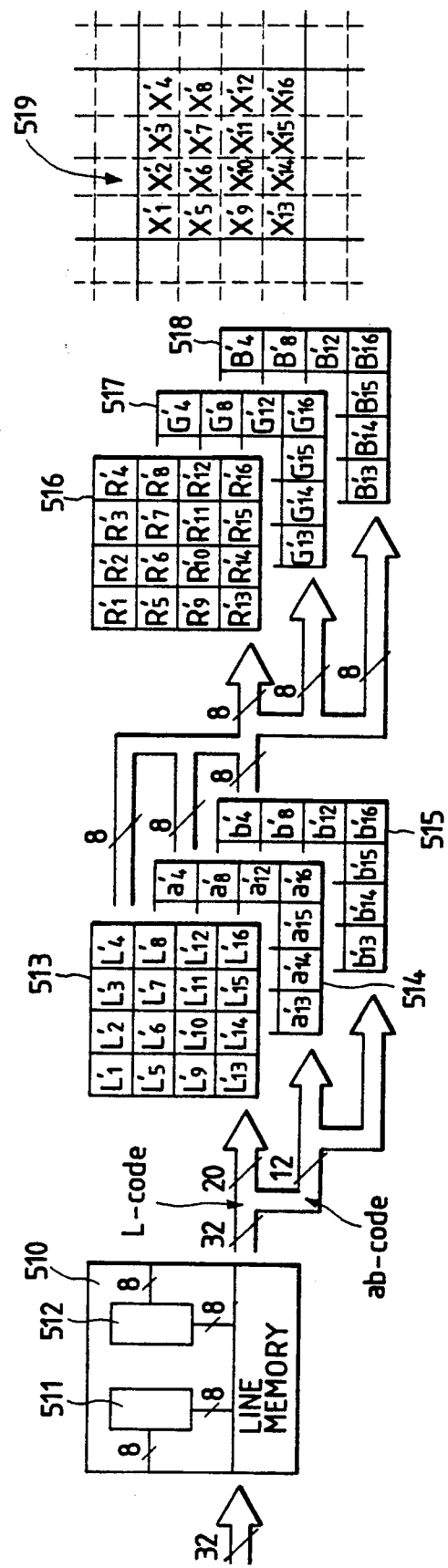

FIG. 5 is a view showing the flow of compression & expansion processing. Referring to FIG. 5, a pixel block 502 of an original image 501 is constituted by, e.g., (4×4) pixels $X_1$ to $X_{16}$. This original image 501 is separated into three primary colors $R_1$, $G_1$, and $B_1$, the pixel $X_1$ is separated into $R_2$, $G_2$, and $B_2$, and the pixel $X_{16}$ is separated into $R_{16}$, $G_{16}$, and $B_{16}$, as indicated by reference numerals 503, 504, and 505, respectively. In addition, for the convenience in color information processing, the above R, G, and B data are converted into a lightness index L* 506 and chromaticity indexes a* 507 and b* 508 of a CIE1976L*a*b* colorimetric system. A block L* ($L_1$ to $L_{16}$) of the lightness data thus obtained is encoded into a final L-code, and blocks a* ($a_1$ to $a_{16}$) and b* ($b_1$ to $b_{16}$) of the chromaticity data are sequentially, generally encoded through a plurality of stages to obtain a final ab-code. In this encoding, if a 4×4 pixel block is used, 16 pixels×3 colors×8 bits=384 bits. Therefore, when data is encoded into 32 bits as in this embodiment, the data is compressed to 1/12.

As the encoding method, there is a method in which orthogonal transform is performed for each of the L*, a*, and b* components in units of blocks, and the obtained spatial frequency component is vector-quantized.

Alternatively, in place of the vector quantization, a DC component of the spacial frequency component may be Huffman-coded while its AC component is scanned in a zigzag manner in a block and then Huffman-coded.

Examples of the orthogonal transform are Discrete Cosine Transform (DCT) and Hadamard transform.

The coded data are temporarily stored in the code memory 207 (509) on the basis of write enable signals 217 and 218 generated by the area generation unit 216 and are sequentially read out on the basis of read enable signals 217 and 218 as needed. In this case, since the data in the memory is coded as the block of 4×4, data in an amount corresponding to 4×4 must be supplied to decoding means in order to decode the data. A decoded data controller 510 is necessary for this purpose. This decoded data controller is roughly classified into a line memory, a data parallel/serial circuit 511, and a data serial/parallel circuit 512 and converts, e.g., 32 bits into 8 bits×4 to effectively use the memory. The data supplied from the encoding code memory as described above are input to the controller and decoded into L* 513, a* 514, and b* 515 and R 516, G 517, and B 518 by means opposite to the encoding means. A decoded signal 519 is converted into Y, M, and C by a converting unit (not shown).

Figure 6:
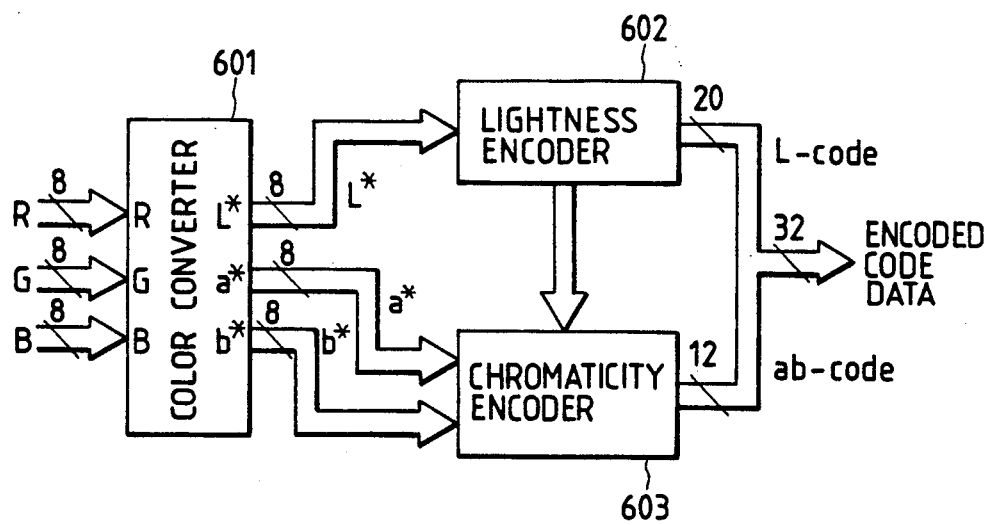
FIGS. 6 and 7 are block diagrams showing signal conversion.

FIG. 6 is a block diagram showing the encoder unit 206. Referring to FIG. 6, a color converter 601 converts the input R, G, and B data into the lightness data L* and the chromaticity data a* and b* of the CIE1976L*a*b* colorimetric system. A lightness encoder 602 encodes the lightness data L* into the L-code. A chromaticity encoder 603 and encodes the chromaticity data a* and b* together into the final ab-code.

Figure 7:
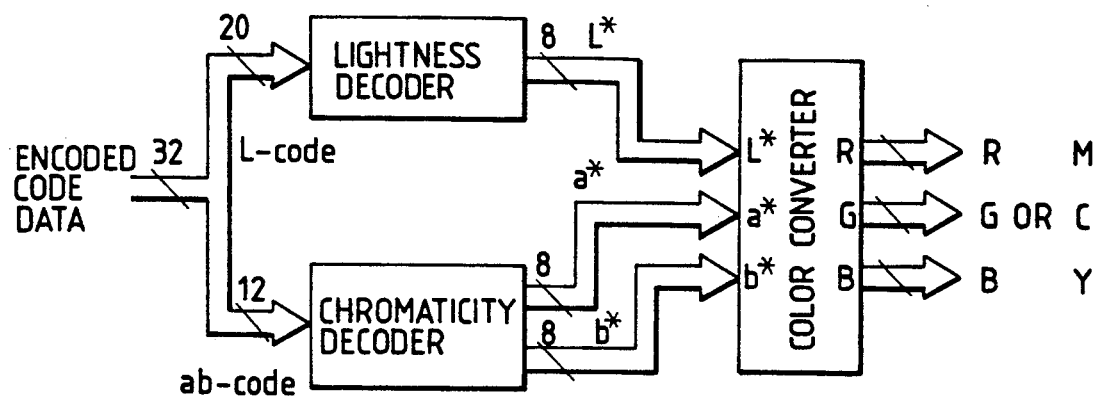

FIG. 7 is a block diagram showing the decoder unit 208. The arrangement for the decoding is made smaller than that for the encoding because the number of bits to be processed in the decoding is decreased as compared with that processed in the encoding. The decoding is performed by executing an algorithm opposite to that of the encoding.

Time-division data processing will be described in detail below. As shown in FIG. 5, the image data is sequentially encoded in units of 4×4 blocks. Therefore, a unit of 4 pixels×4 lines is defined as one address in the memory space, and 32-bit encoding code data is stored at timings shown in FIG. 8 and read out at the respective timings of Y, M, C, and K. That is, in this system, the data is time-divided into 4×4 =16 blocks, and timings of writing of the encoded data into the memory or reading out of each color are predetermined for each block, thereby independently accessing an address in a memory space.

A process of performing the time-division processing to read out the encoding code data and performing the decoding processing will be described below. As described above, the read operation of the encoding code data is performed by the time-division processing at an arbitrary timing in the 4×4 block. However, since the encoding is performed by using each 4×4 pixel block as unit data, the data must be returned to the 4×4 pixel data in order to read out the data from the memory and decode it. For this purpose, data corresponding to the 4×4 blocks (i.e., 16 data) must be input to the decoder.

Figure 8:
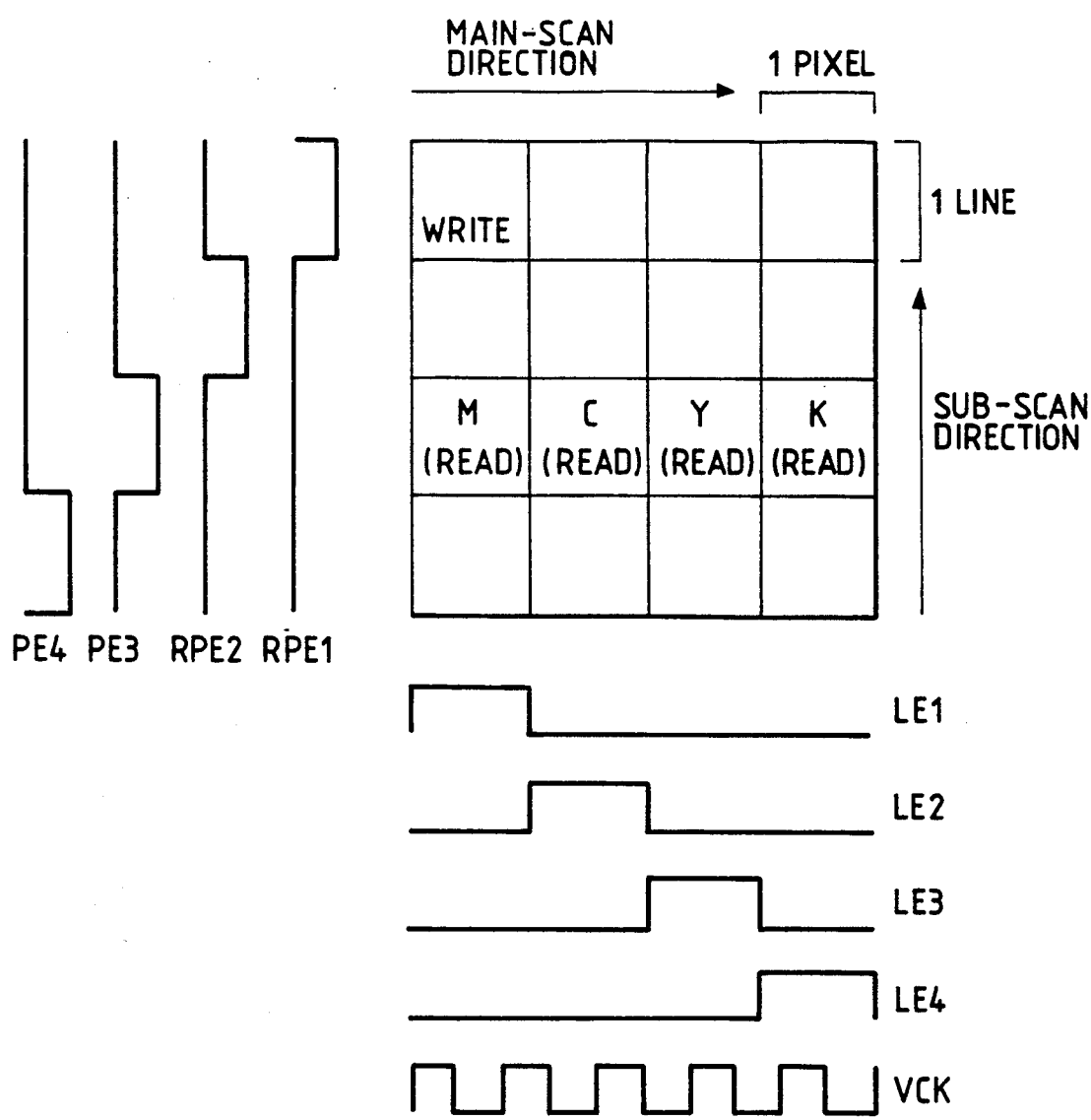
FIG. 8 is a view showing addresses of the memory.
Figure 9:
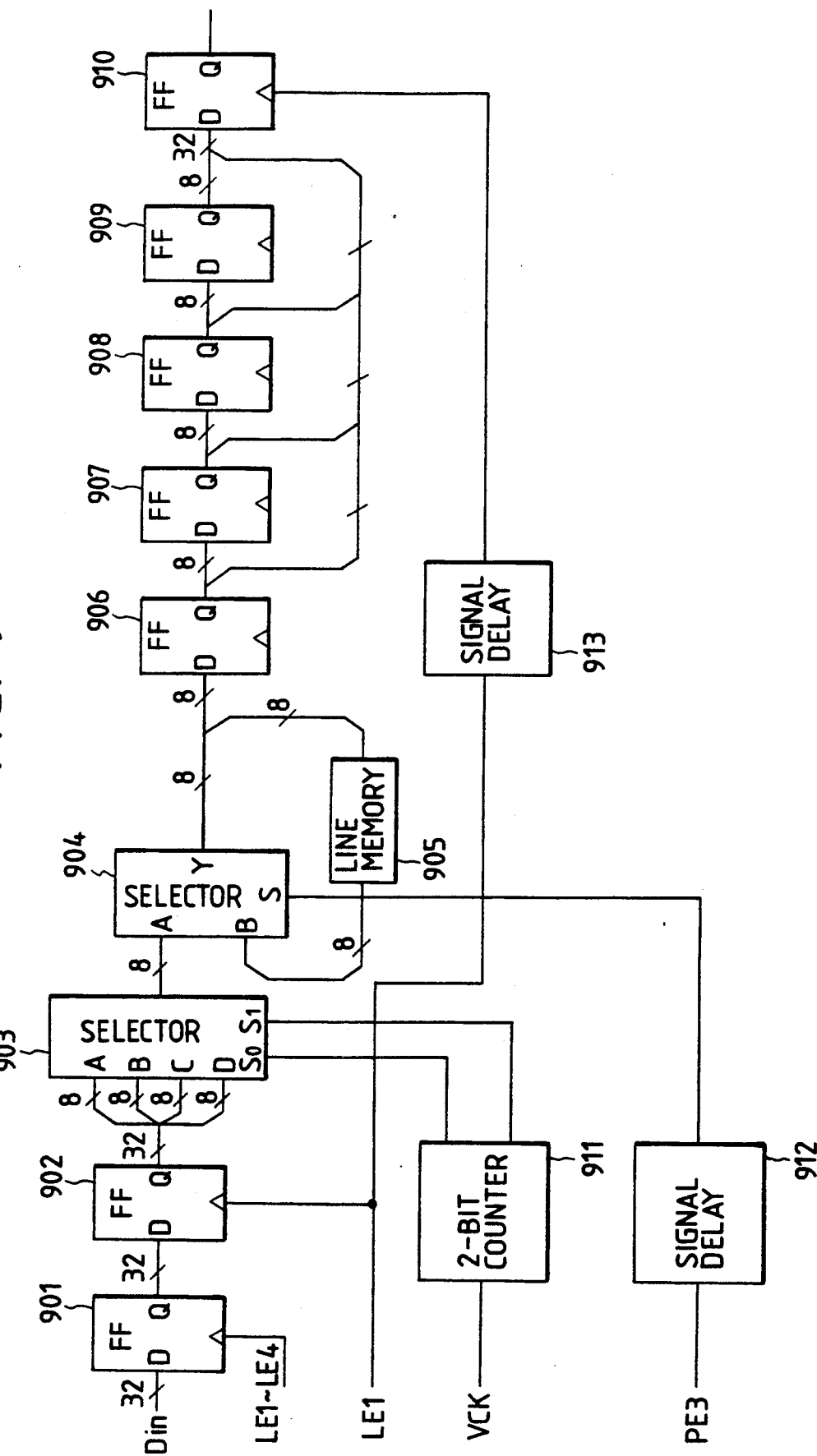
FIG. 9 is a block diagram for explaining timings of signals.

FIG. 9 shows a circuit for realizing the above operation at a timing of, e.g., C (READ) shown in FIG. 8.

The circuit shown in FIG. 9 comprises flip-flops 901, 902, 906, 907, 908, 909, and 910, selectors 903 and 904, a line memory 905, a 2-bit counter 911, and signal delay circuits 912 and 913.

Referring to FIG. 9, when LE2 is input to LE1 to LE4 and the encoding code data is input to Din, code data obtained by parallel/serial-converting 32 bits is stored in units of blocks in an additionally provided line memory, and the data is continuously output from the line memory until the processing is finished for four sub-scan lines. The data from the line memory is returned to 32 bits by a serial/parallel converter in the subsequent stage. M, Y, and K can be similarly operated by inputting timing pulses LE1, LE3, and LE4 for the inputs LE1 to LE4 shown in FIG. 9.

The image area separation processor 210 performs the following processing for a black character, a color character, a screen image, and a halftone image on the basis of the judgment signals generated by the units 213 to 215 described above.

| [Processing 1] | Processing for black character |
|---|---|
| [1-1] | Signals (219' to 222') obtained by ink extraction as a video are used. |
| [1-2] | Y (221), M (219), and C (220) data are subjected to subtraction in accordance with a multivalue achromatic chromaticity signal 3341 or a set value. On the other hand, Bk (222) data is subjected to addition in accordance with the multivalue achromatic chromaticity signal 3341 or the set value. |
| [1-3] | Edge emphasis is performed. |
| [1-4] | A black character is printed out at a high resolution of 400 lines (400 dpi). |
| [1-5] | Color remainder removal processing is performed. |
| [Processing 2] | Processing for color character |
| [2-1] | Edge emphasis is performed. |
| [2-2] | A color character is printed out at a resolution of 400 lines (400 dpi). |
| [Processing 3] | Processing for screen image |
| [3-1] | Smoothing is performed (in units of two pixels in the main-scan direction) as a countermeasure against moiré. |
| [Processing 4] | Processing for halftone image |
| [4-1] | Selection can be performed between smoothing (in units of two pixels in the main-scan direction) and through. |

A circuit for performing the above processing will be described below.

Figure 10:
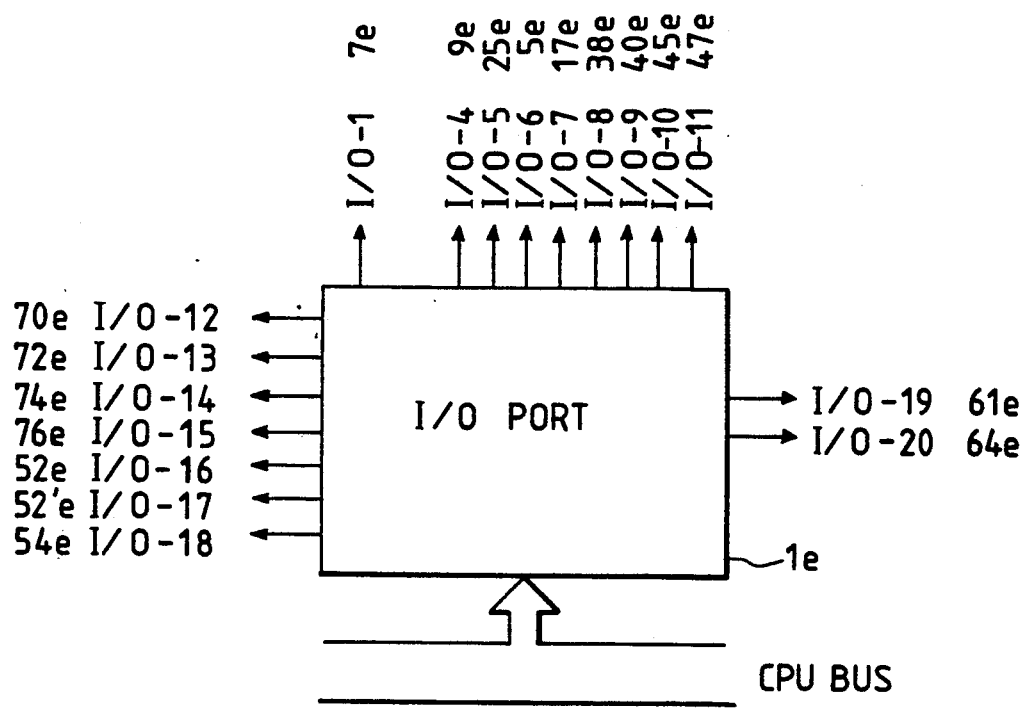
FIGS. 10 and 11 (which consists of FIGS. 11A and 11B) are views showing a character & image correction unit.
Figure 11B:
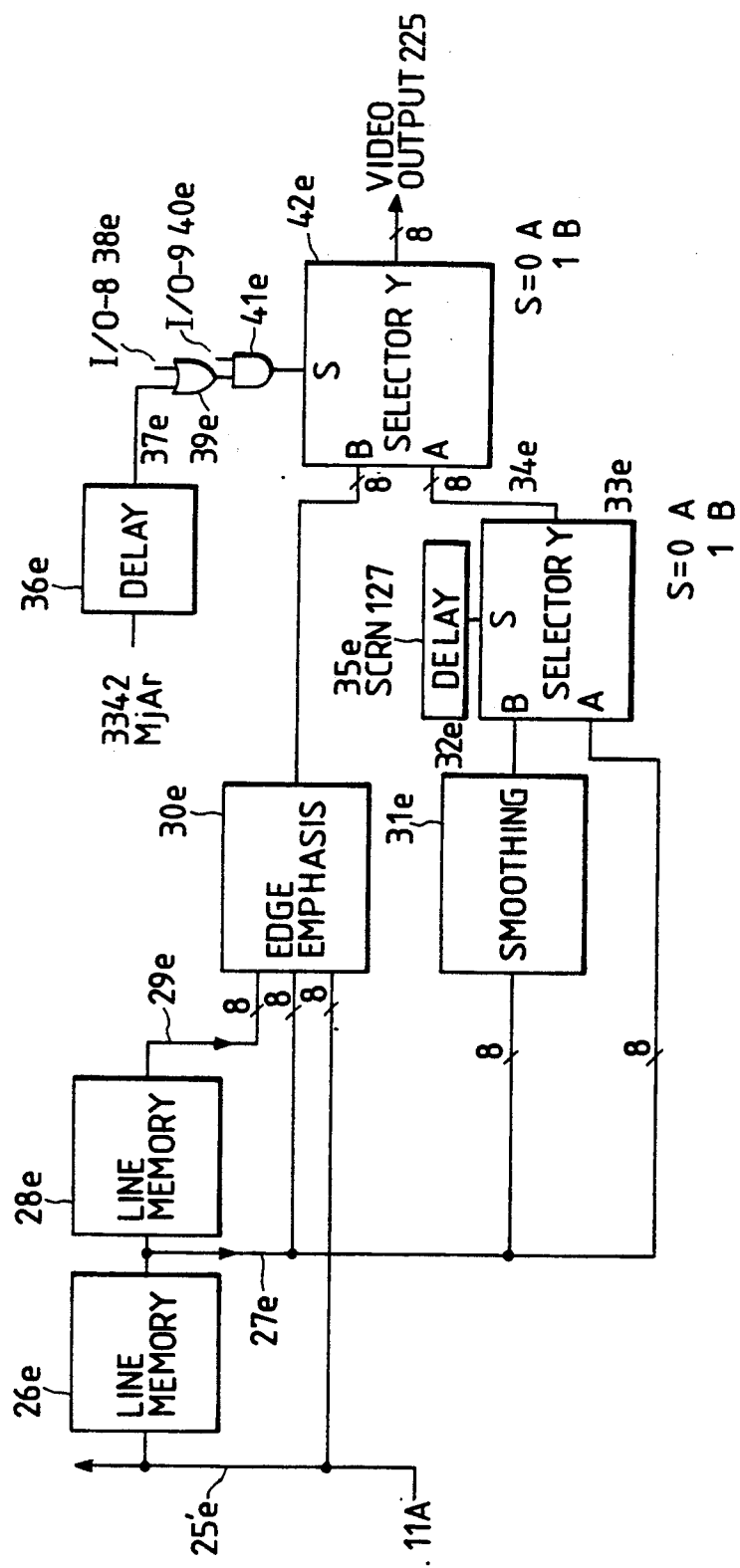

FIGS. 10 and 11 are block diagrams for explaining the image area separation processor in detail. Although a circuit for only the M component is shown in FIG. 11, circuits for the other three colors (C, Y, and K) have the same arrangement and therefore detailed descriptions thereof will be omitted.

The circuit shown in FIG. 11 comprises a selector 6e for selecting the video input signal 219 or the MBk 219', an AND gate 6e' for generating a signal for controlling the selector, a block 16e for performing color remainder removal processing (to be described later), an AND gate 16e' for generating an enable signal of the processing, a multiplier 15e for performing multiplication between an output 13e from the selector 6e and a set value 14e of an I/O port, an XOR gate 20e, an AND gate 22e, an adder & subtracter 24e, line memories 26e and 28e for delaying one-line data, an edge emphasis block 30e, a smoothing block 31e, a selector 33e for selecting through data or smoothing data, a delay circuit 32e for synchronization of a control signal of the selector, a selector 42e for selecting the result of edge emphasis or the result of smoothing, a delay circuit 36e and an OR gate 39e for synchronization of a control signal of the selector, an AND gate 41e, an inverter circuit 44e for outputting a 400-line (dpi) signal ("L" output) to the character judgment unit, an AND gate 46e, an OR gate 48e, and a delay circuit 43e for synchronization between video outputs 224 and 225. The image area separation processor is connected to a CPU bus (not shown) via an I/O port 1e.

The above arrangement will be divided into [1] a color remainder removal processor for removing a color signal remaining around the edge of a black character portion and a unit for performing subtraction at a predetermined ratio for the Y, M, and C data of the black character portion judgment unit and addition at a predetermined ratio for the Bk data; [2] a unit for selecting edge emphasis data for a character portion, smoothing data for a screen-judged portion, and through data for other halftone images; and [3] a unit for setting the video output 224 at level "L" for a character portion (i.e., printing the character portion at a resolution of 400 dpi), and each unit will be described below.

[I] Color Remainder Removal Processing and Addition & Subtraction Processing

This processing is performed for a portion where both of the signal GRBi indicating an achromatic color and the signal MjAR 3342 indicating a character portion are active, i.e., the edge portion of a black character and its peripheral portion. In the processing, removal of Y, M, and C components extending from the edge portion of a black character and inking for the edge portion are performed.

An operation of the processing will be described in detail below.

This processing is performed when a character portion judgment is output (MjAR 3342="1") and a black character is judged (GRBi 3341="1"). In this case, the selector 6e selects the video input 219 (sets "0" in an I/O-6 (5e)). Therefore, the parts 15e, 20e, 22e, and 17e generate data to be subtracted from the video 8e (this similarly applies to the C and Y data).

The multiplier 15e performs multiplication between the selector output data 13e and the value set in an I/O-14e. Data 18e which is 0 to 1 times the data 13e is generated. By setting "1"s in registers 9e and 25e, two's complement data of 18e are generated by the parts 17e, 20e, and 22e. Lastly, since 23e in the addition 23e of 8e is a two's complement, subtraction of 17e-8e is actually performed by the adder & subtracter 24e, and the difference is output from the register 25e.

When the recording Bk data (222) is to be processed, the selector 6e selects BkMj 222' (sets "1" in the I/O-6 5e). The parts 15e, 20e, 22e, and 17e generate data to be added to the video 17e. This processing is different from the above processing for M in that "0" is set in an I/O-4 9e. As a result, 23e=8e and Ci=0, and 17e+8e is output from the register 25e. The manner of generation of the coefficient 14e is the same as in the cases of Y, M, and C.

This addition & subtraction processing (for a black character) is illustrated in FIGS. 12A to 12E in which FIGS. 12A and 12C show a hatched portion of a black character N in an enlarged scale. Subtraction from a video is performed for the Y, M, and C data where a character signal portion is "1" (FIG. 12B), and addition to the video is performed for the Bk data where the character signal portion is "1" (FIG. 12D). In .FIGS. 12A to 12E, 13e=18e, i.e., the Y, M, and C data is 0 and the Bk data is twice the video in the character portion.

With this processing, the contour portion of the black character is printed out in substantially black monochrome, but the Y, M, and C data falling outside the contour signal and portions indicated by symbols * in FIG. 12B remain as a color remainder around the character to degrade the image quality.

Color remainder removal processing is performed to remove this color remainder. This processing is performed for pixels falling within the range of an extended area of a character portion and present in a portion where the video data 13e is smaller than a comparison value set by the CPU, i.e., pixels located outside the character portion and possibly having a color remainder. In the processing, a minimum value of three or five such adjacent pixels is obtained.

The processing will be described in more detail below using a circuit.

Figure 13:
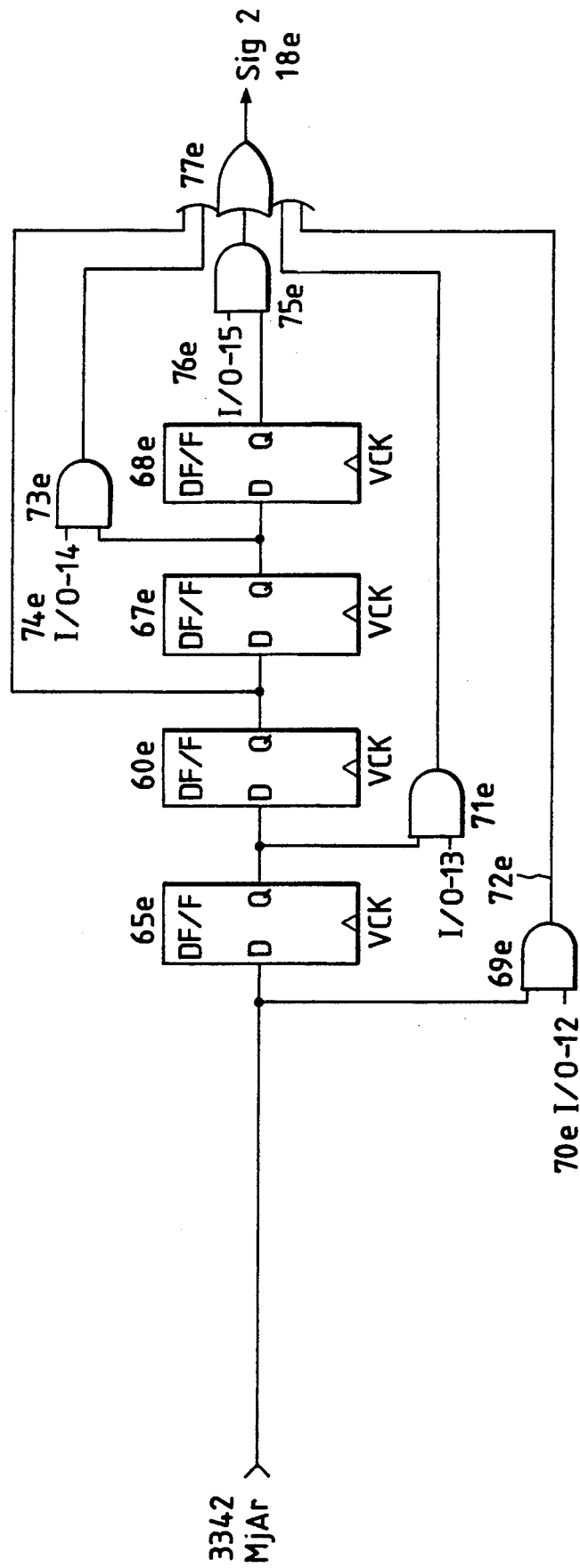
FIG. 13 is a circuit diagram showing switching signal generation.

FIG. 13 shows a character area enlargement circuit for enlarging a character portion area, which comprises DF/Fs 65e to 68e, AND gates 69e, 71e, 73e, and 75e, and an OR gate 77e.

When "1"s are set in all of I/O ports 70e, 72e, 74e, and 76e, Sig 2 18e outputs a signal extended forward and backward by two pixels each in the main-scan direction with respect to the MjAr 3342 of "1". When the I/O ports 70e and 75e are "0" and I/O ports 71e and 73e are "1", the Sig 2 18e outputs a signal extended forward and backward by one pixel each in the main-scan direction.

The color remainder removal processor 16e will be described below.

Figure 14:
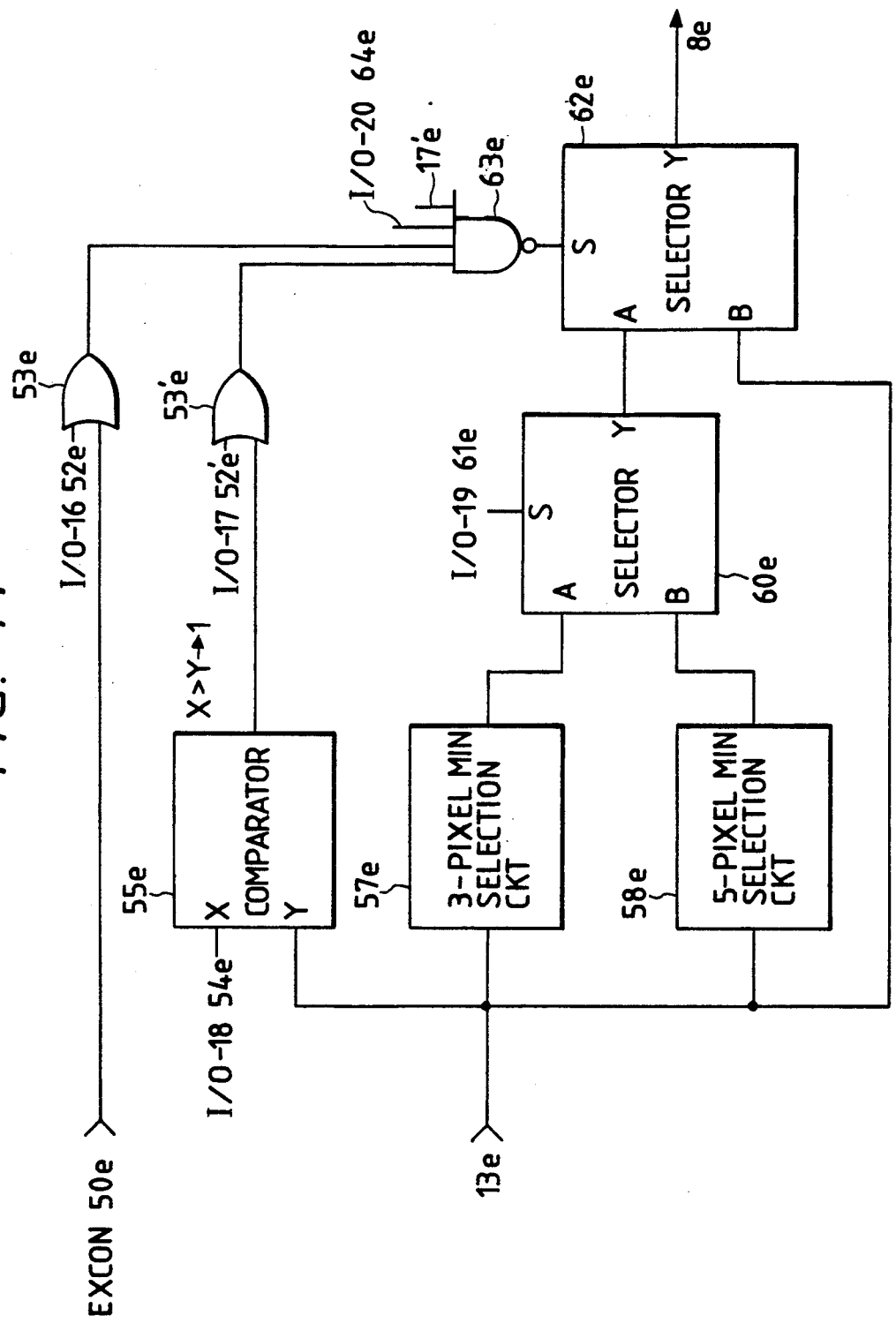
FIGS. 14 and 15A to 15F are a circuit diagram and views showing a color remainder removal processing circuit.

FIG. 14 is a circuit diagram showing the color remainder removal processor.

Referring to FIG. 14, a 3-pixel min selection circuit 57e selects a minimum value of three pixels constituted by an objective pixel and two pixels present before and behind the objective pixel with respect to an input signal 13e, and a 5-pixel min selection circuit 58e selects a maximum value of five pixels constituted by an objective pixel and four pixels, two pixels each, before and behind the objective pixel with respect to the input signal 13e. A comparator 55e compares the input signal 13e with an I/O-18 54e and outputs a signal of "1" when the I/O-18 54e is larger. The processor also includes selectors 61e and 62e, OR gates 53e and 53'e, and a NAND gate 63e.

In the above arrangement, the selector 60e selects the 3-pixel min selection circuit or the 5-pixel min selection circuit on the basis of the value of an I/O-19 from the CPU bus. In this case, a larger color removal effect is obtained by the 5-pixel min selection circuit. The circuits can be selected by manual setting of an operator or automatic setting by the CPU.

The side A of the selector 62e is selected when an output from the NAND gate 63e is "0", i.e., when the comparator 55e judges that the video 13e is smaller than the register value 54e and falls within the enlarged range of a signal of a character portion and 17'e is "1". When 17'e is not "1", the side B of the selector 62e is selected. (Note that, at this time, the registers 52e and 64e are "1" and the register 52'e is "0".)

When the side B of the selector 62e is selected, through data is output as 8e.

An EXCON 50e can be used in place of the comparator 55e when, e.g., a binary signal of a luminance signal is input.

Figure 15A:
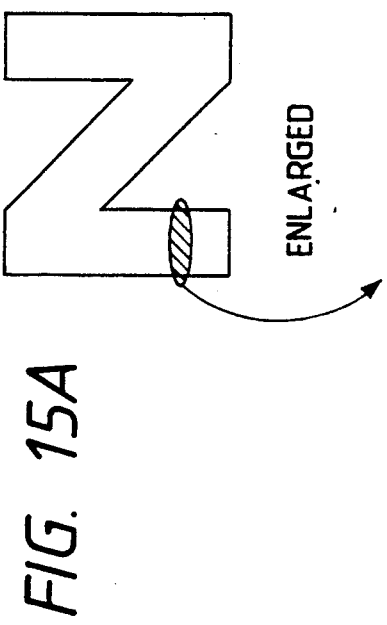
Figure 15B:
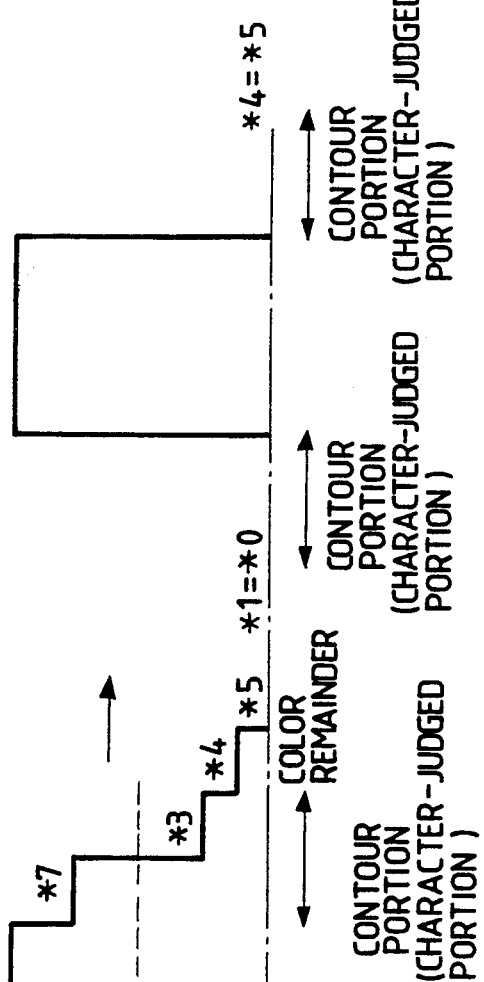
Figure 15C:
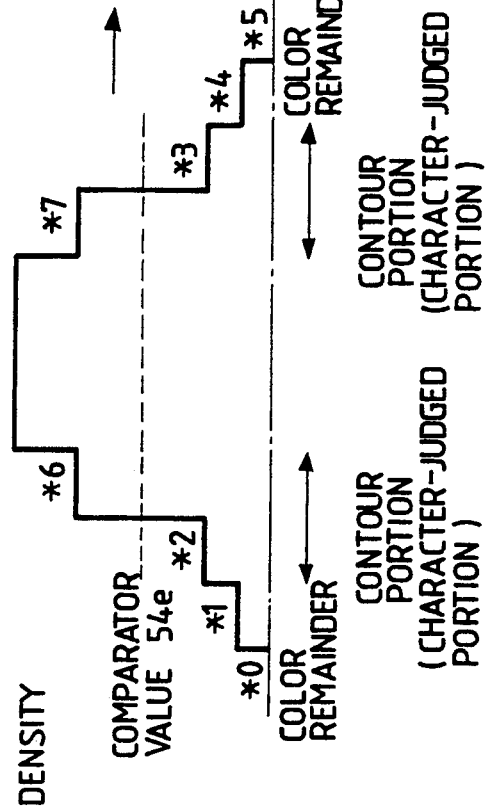
Figure 15E:
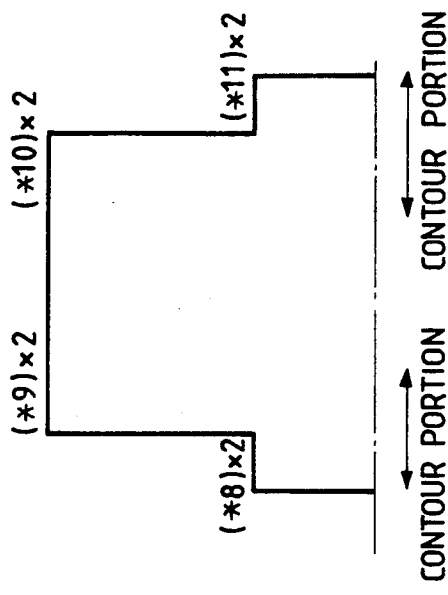

FIGS. 15A to 15F show a portion subjected to the above two processing operations. FIG. 15A shows a black character N, and FIG. 15B shows an area judged to be a character in the Y, M, and C data as density data of a hatched portion. That is, in FIG. 15B, character-judged portions (*2, *3, *6, and *7) are converted to "0" by the subtraction processing, and portions *1 and *4 are converted by the color removal processing such that *1←*0 and *4←*5, i.e., converted to "0". As a result, an area as shown in FIG. 15C is obtained.

Figure 15D:
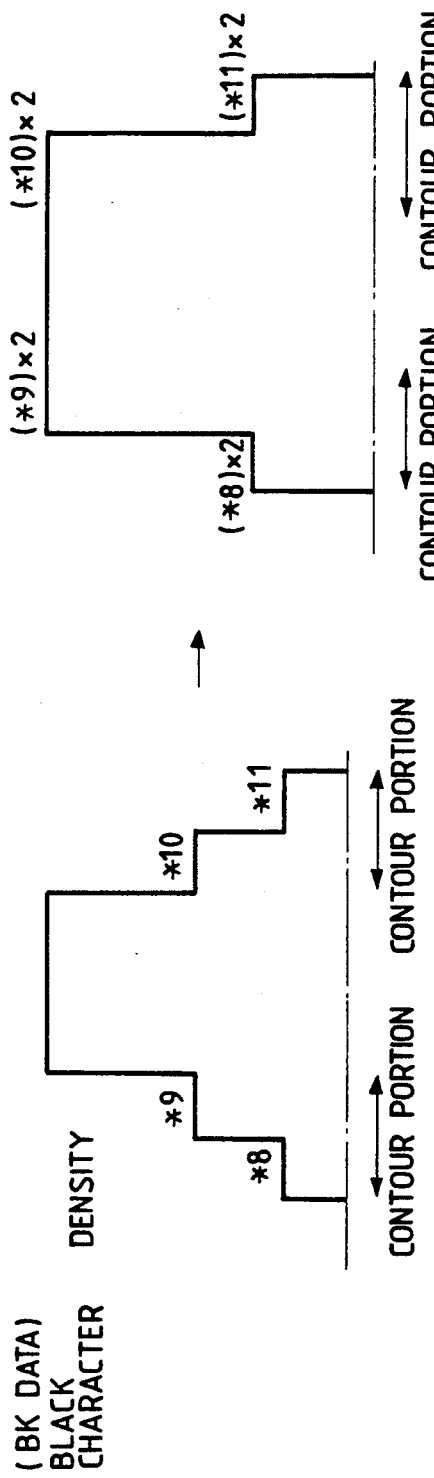

On the other hand, in the case of the Bk data as shown in FIG. 15D, only the addition processing is performed for character-judged portions (*8, *9, *10, and *11) to obtain an output having a clear black contour as shown in FIG. 15A.

Figure 15F:
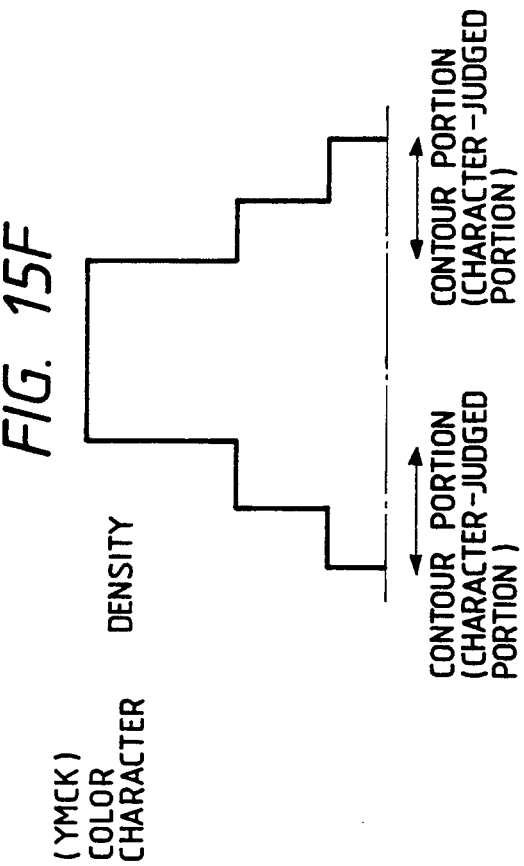

Note that no change is given to a color character as shown in FIG. 15F.

[2] Edge Emphasis or Smoothing Processing

In this processing, edge emphasis is performed for a character-judged portion, smoothing is performed for a screen portion, and through is performed for other portions.

Figure 16:
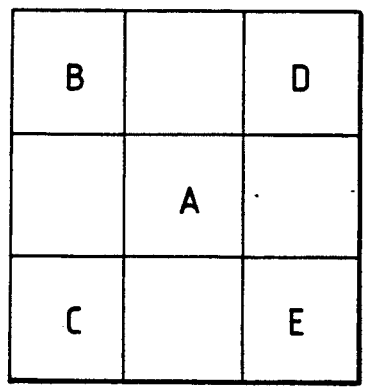
FIGS. 16 and 17 are views showing filter processing.

Character Portion→Since MjAR 3342 is "1", an output from the 3×3 edge emphasis block 30e, which is generated by signals from the three lines 25e, 27e, and 29e, is selected by the selector 42e and output from 43e. Note that the edge emphasis is calculated from a matrix and a relation as shown in FIG. 16.

Figure 17:
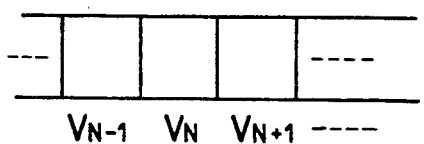

Screen Portion→Since SCRN 35e is "1" and the MjAR 21e is "0", a signal obtained by performing the smoothing 31e for the signal 27e is output from the selectors 33e and 42e. Note that this smoothing is processing using, when an objective pixel is $V_N$, $(V_N+V_{N+1})/2$ as data of the objective pixel $V_N$, i.e., smoothing of two pixels in the main-scan direction, as shown in FIG. 17. The smoothing prevents moiré which may be produced in a screen portion.

Other Portion→The other portion is a portion neither a character portion (character contour) nor a screen portion, i.e., a halftone portion. In this processing, since both the MjAr 3342 and the SCRN 35e are "0", data of the line 27e is directly output from the video output 43e.

When a character is a color character, the above two processing operations are not performed even if a character-judged portion is included.

Although the color remainder removal processing is performed in only the main-scan direction in this embodiment, the processing may be performed in both the main- and sub-scan directions.

[3] Character Portion 400 Line (dpi) Output Processing 224 is output from 48e in synchronism with the video output 225. More specifically, an inverted signal of MjAR 3341 is output in synchronism with 43e. 224=0 is obtained for a character portion, and 200/400="1" is obtained for other portions.

As a result, a character-judged portion, i.e., the contour portion of a character is printed out at a resolution of 400 lines (dpi), whereas the other portions are printed out at a resolution of 200 lines.

As described above, the above processing is performed for each of the data of four colors, and the γ conversion 211, the edge emphasis 212, and the 200/400 switch signals 224 of the four colors are supplied to the LBP printer 102 in synchronism with 229 to 232 by the delay circuit 223.

In this manner, although data quality is degraded upon compression and expansion, a character is output at a high resolution, an image is output with a high gradation, and a black character is output in black monochrome.

[Second Embodiment]

Figure 18B:
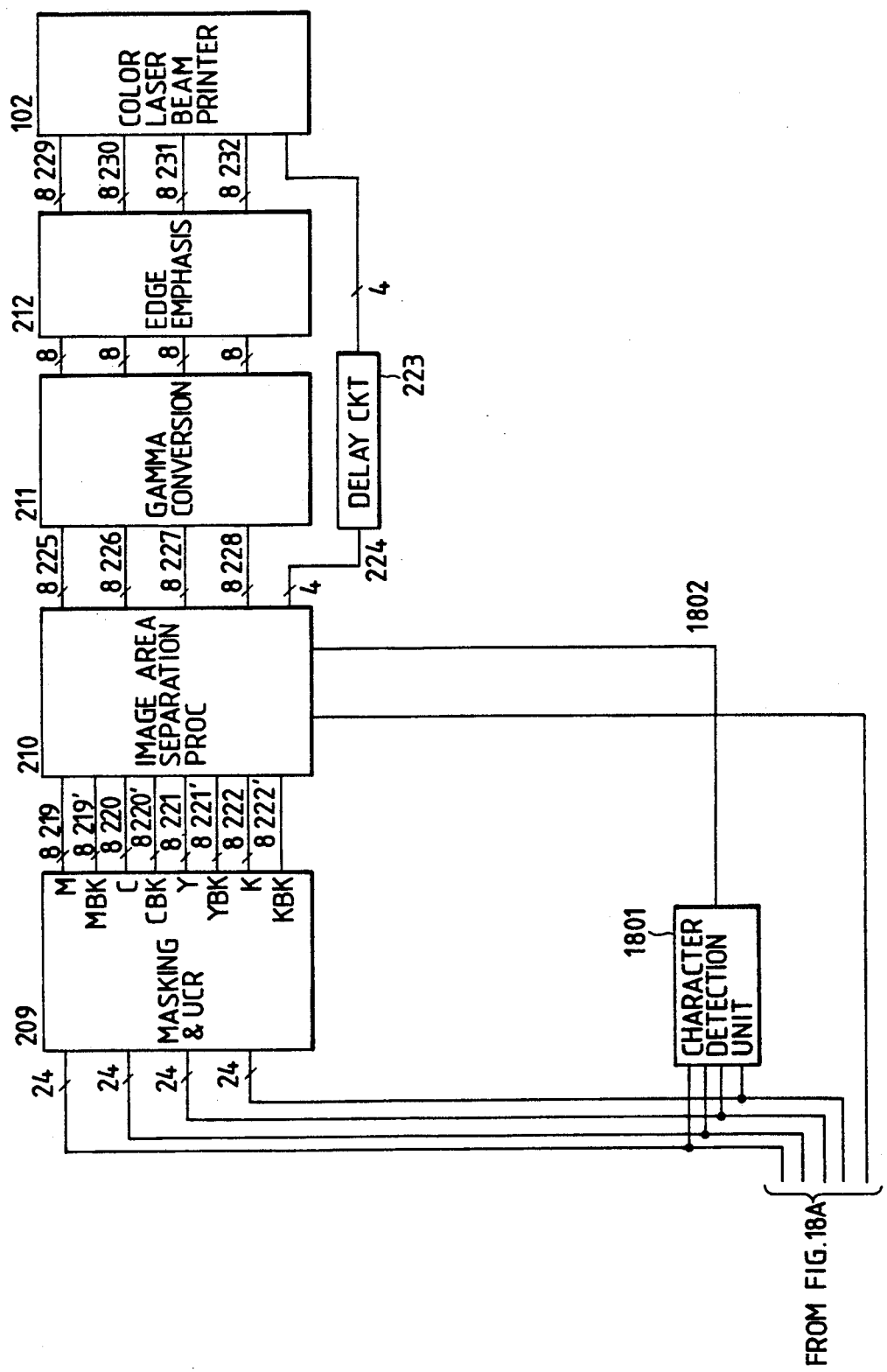
FIG. 18, which consists of FIGS. 18A and 18B, is a block diagram showing the second embodiment of the present invention.

FIG. 18 is a block diagram for explaining the second embodiment of the present invention. The second embodiment is different from the first embodiment in that data subjected to compression and expansion is used as data from a character detection unit. A color detection unit 213 and a character detection unit 1801 are exactly the same as those in the first embodiment, and a memory unit 1803 has a capacity (4 bits) half that of the memory used in the first embodiment.

This method has a problem in which image degradation caused by compression and expansion easily appears in an image but has a great advantage of a small memory capacity.

As has been described above, even in a system in which at least one of input image data or data obtained by compressing and storing the input image data is used to detect the characteristics of an image, and image processing is performed for data read out from a memory on the basis of the detection result, thereby compressing and storing the input image data in a memory, image area separation processing can be performed to realize an output image with high gradation and high image quality.

In the above embodiments, the processing is performed for both of an image signal and (attribute) information in units of 4×4 blocks. However, the block size is not limited to 4×4 but may be arbitrarily selected.

In the above embodiments, character area information and black pixel information judged from an image are processed as attribute information about the characteristics of an image. However, the present invention is not limited to the above embodiments.

The above input means is not limited to an image scanner but may be a TV camera, an SV camera, an interface of a computer, or the like.

The printer may be a dot printer, a thermal transfer printer, an ink-jet printer, a printer using a head which discharges ink droplets by utilizing film boiling caused by heat energy.

In addition, the present invention can be applied to a color facsimile apparatus and a color filing system as well as an image copying apparatus. That is, the system of the present invention can be used as a color facsimile apparatus by connecting a modem to the output of the memory 207 shown in FIG. 2 to transmit encoded data and providing the decoder unit 208 and the subsequent units on the receiving side. On the other hand, when an optomagnetic disk or a floppy disk is used as the memory 207, the system can be used as a filing system.

The image encoding method may be any of orthogonal transform encoding, e.g., so-called ADCT (Adaptive Discrete Cosine Transform), vector quantization, and the like as long as the encoding is performed in units of blocks.

The encoding may be performed using not L*a*b components but L*U*V or Y*I*Q components.

Alternatively, the encoding may be performed directly using the RGB components without converting them into luminance and chromaticity components.

As has been described above, according to the present invention, there is provided an image processing apparatus capable of obtaining an image with high image quality.

The present invention is not limited to the above embodiments but can be variously modified and applied without departing from the spirit and scope of the present invention.

What is claimed is:

1. An image processing apparatus comprising:
   a) input means for inputting image data;
   b) compressing means for compressing the input image data;
   c) memory means for storing the compressed image data;
   d) detecting means for detecting a line image of a predetermined color using at least one of the input image data input by said input means and the compressed image data read out from said memory means; and
   e) processing means for performing image processing of the compressed image data read out from said memory means on the basis of a detection result obtained by said detecting means.

2. An apparatus according to claim 1, wherein said input means comprises an image reader for scanning an original and generating image data consisting of a plurality of color components.

3. An apparatus according to claim 1, wherein said compressing means performs the data compression using an orthogonal transform.

4. An apparatus according to claim 1, wherein said compressing means performs the data compression by dividing luminance data and chrominance data.

5. An apparatus according to claim 1, wherein said predetermined color is a black.

6. An apparatus according to claim 1, further comprising image forming means for forming an image in accordance with the image data processed by said processing means.

7. An apparatus according to claim 6, wherein said image forming means comprises a bubble jet printer.

8. An apparatus according to claim 6, wherein said image forming means comprises a laser beam printer.

9. An apparatus according to claim 8, wherein said laser beam printer has a plurality of photosensitive drums.

10. An image processing apparatus comprising:
    a) memory means for storing input image data;
    b) detecting means for detecting a black line image using at least one of the input image data and image data read out from said memory means; and
    c) processing means for performing image processing on the basis of the data read out from said memory means and a detection result by said detecting means,
    wherein said processing means prints pixels of the black line image in black monochrome in accordance with the feature of the image.

11. An apparatus according to claim 10, further comprising compressing means for compressing the input image data,
    wherein said memory means stores the compressed image data.

12. An apparatus according to claim 10, further comprising second memory means for storing the detection result obtained by said detecting means.

13. An image processing apparatus comprising:
    a) compressing means for compressing input image data;
    b) first memory means for storing the compressed image data;
    c) second memory means for storing a portion of a black line image of the input image data; and d) control means for synchronously reading out the contents stored in said first and second memory means.

14. An apparatus according to claim 15, further comprising decompressing means for decompressing the compressed image data read out from said first memory means by said control means.

15. An apparatus according to claim 13, wherein said control means generates memory read enable signals in main- and sub-scan directions.

16. An apparatus according to claim 14, further comprising processing means for processing decompressed image data in accordance with black-line-image data read out by said control means.

17. An apparatus according to claim 16, wherein said processing means prints the portion of the black line image in black monochrome.

18. An image processing apparatus comprising:
a) correcting means for correcting input image data;
b) compressing means for compressing the input image data corrected by said correcting means; and
c) detecting means for detecting color information and edge information of the input image,
wherein said detecting means detects at least the color information of the input image after said correcting means performs the correction and before said compressing means performs the compression.

19. An apparatus according to claim 18, wherein said detecting means detects a portion of a black line image of the input image.

20. An apparatus according to claim 18, further comprising decompressing means for decompressing the compressed image data read out from said memory means.

21. An apparatus according to claim 20, further comprising processing means for processing the image data decompressed by said decompressing means in accordance with the feature of the image detected by said detecting means.

22. An apparatus according to claim 21, wherein said processing means prints the portion of the black line image in black monochrome.

23. An image processing method comprising the steps of:
a) inputting image data;
b) compressing the input image data;
c) storing the compressed image data in a memory;
d) detecting a line image of a predetermined color using at least one of the input image data and compressed image data read out from the memory; and
e) performing image processing on the basis of the compressed image data read out from the memory and a detection result obtained in said detecting step.

24. An image processing method comprising the steps of:
a) storing input image data in a memory;
b) detecting a line image of a predetermined color in at least one of the input image data and image data read out from the memory; and
c) performing image processing on the basis of the image data read out from the memory and a detection result obtained in said detecting step,
wherein said processing step further includes the step of printing pixels of the line image of the predetermined color in monochrome in accordance with a feature of the image.

25. An image processing method comprising the steps of:
a) compressing input image data;
b) storing the compressed input image data in a first memory and storing a portion of a line image of a predetermined color of the input image data in a second memory; and
c) synchronously reading out contents stored in the first and second memories.

26. An image processing method comprising the steps of:
a) correcting input image data;
b) compressing the corrected image data;
c) detecting color information and edge information of an image represented by the corrected image data,
wherein at least the color information of the image is detected after said correcting step and before said compressing step.

* * * * *

UNITED STATES PATENT AND TRADEMARK OFFICE
CERTIFICATE OF CORRECTION

PATENT NO. : 5,165,072
DATED : November 17, 1992
INVENTOR(S) : MITSURU KURITA, ET AL.

It is certified that error appears in the above-identified patent and that said Letters Patent is hereby corrected as shown below:

COLUMN 1

Line 17, "speeds" should read --speeds,--.

COLUMN 2

Line 9, "leg, black-line" should read --(e.g., black) line--.

COLUMN 8

Line 30, "and" (first occurrence) should be deleted.

COLUMN 15

Line 4, "claim 15," should read --claim 13,--.

Signed and Sealed this

Sixteenth Day of November, 1993

Attest:

BRUCE LEHMAN

Attesting Officer     Commissioner of Patents and Trademarks